(12) United States Patent
Sapire et al.

(10) Patent No.: US 11,471,844 B2
(45) Date of Patent: Oct. 18, 2022

(54) BLENDER APPARATUS WITH SAFETY INTERLOCK SYSTEM

(71) Applicant: BEAST HEALTH, LLC, Pacific Palisades, CA (US)

(72) Inventors: Colin Sapire, Pacific Palisades, CA (US); Benjamin Bangser, Los Angeles, CA (US); Shu Bo Xie, Ningbo (CN); Fang Sheng Dai, Ningbo (CN); An Jun Ye, Ningbo (CN)

(73) Assignee: BEAST HEALTH, LLC, Pacific Palisades, CA (US)

( * ) Notice: Subject to any disclaimer, the term of this patent is extended or adjusted under 35 U.S.C. 154(b) by 0 days.

(21) Appl. No.: 17/292,314

(22) PCT Filed: Sep. 7, 2020

(86) PCT No.: PCT/CN2020/113845
§ 371 (c)(1),
(2) Date: May 7, 2021

(87) PCT Pub. No.: WO2021/043312
PCT Pub. Date: Mar. 11, 2021

(65) Prior Publication Data
US 2021/0354100 A1 Nov. 18, 2021

Related U.S. Application Data

(60) Provisional application No. 62/897,077, filed on Sep. 6, 2019.

(51) Int. Cl.
*B22C 5/00* (2006.01)
*B01F 35/60* (2022.01)
(Continued)

(52) U.S. Cl.
CPC ......... *B01F 35/6052* (2022.01); *A47J 43/046* (2013.01); *A47J 43/0716* (2013.01);
(Continued)

(58) Field of Classification Search
CPC ........ B01F 35/31; B01F 27/88; A47J 43/0766
See application file for complete search history.

(56) References Cited

U.S. PATENT DOCUMENTS 5,863,118 A 1/1999 Ackels et al.
6,350,053 B1 2/2002 Morin
(Continued)

FOREIGN PATENT DOCUMENTS

CN 101404918 U 4/2009
CN 203736058 U 7/2014
(Continued)

OTHER PUBLICATIONS

Google machine translation for "CN-207590559-U" (Year: 2018).*
(Continued)

*Primary Examiner* — Anshu Bhatia
*Assistant Examiner* — Gregory Y Huan
(74) *Attorney, Agent, or Firm* — Alston & Bird LLP

(57) ABSTRACT

A blending device (100) is provided including a blade assembly (106) having a blade coupling structure, the blade coupling structure comprising a set of blade electrical connectors (128). The blending device also includes a blender base assembly (104) having a base coupling structure, the base coupling structure comprising a plurality of base electrical connector coupler sets (130A-130C). Each base electrical connector coupler set corresponds with a coupling position of the blade coupling structure and the base coupling structure. The blade assembly and the blender base assembly are electrically coupled in a closed configuration in which the set of blade electrical connectors is in contact (Continued)

with one of the plurality of base electrical connector coupler sets. A method of manufacturing the blending device is also provided.

28 Claims, 12 Drawing Sheets

(51) Int. Cl.
| | |
|---|---|
| *A47J 43/046* | (2006.01) |
| *A47J 43/07* | (2006.01) |
| *B01F 27/88* | (2022.01) |
| *B01F 27/808* | (2022.01) |
| *B01F 35/10* | (2022.01) |
| *B01F 35/31* | (2022.01) |
| *B01F 35/21* | (2022.01) |
| *B01F 35/32* | (2022.01) |
| *B01F 101/00* | (2022.01) |

(52) U.S. Cl.
CPC ....... *A47J 43/0722* (2013.01); *A47J 43/0761* (2013.01); *A47J 43/0766* (2013.01); *B01F 27/808* (2022.01); *B01F 27/88* (2022.01); *B01F 35/10* (2022.01); *B01F 35/2115* (2022.01); *B01F 35/31* (2022.01); *B01F 35/3213* (2022.01); *B01F 2101/1805* (2022.01)

(56) References Cited

U.S. PATENT DOCUMENTS

| | | |
|---|---|---|
| 6,513,967 B2 | 2/2003 | Masip et al. |
| 6,632,013 B2 | 10/2003 | Wulf et al. |
| D487,668 S | 3/2004 | Sands |
| D519,312 S | 4/2006 | Tsai |
| D536,216 S | 2/2007 | Sands |
| 7,220,049 B2 | 5/2007 | Lee |
| D559,036 S | 1/2008 | Hayes et al. |
| 7,690,592 B2 | 4/2010 | Ferraby |
| 7,712,951 B2 | 5/2010 | Bohannon, Jr. et al. |
| 7,871,195 B2 | 1/2011 | Larsen et al. |
| 7,909,501 B2 | 3/2011 | Eden |
| 7,950,842 B2 | 5/2011 | Pryor, Jr. et al. |
| 8,042,990 B2 | 10/2011 | Pryir, Jr. et al. |
| 8,403,555 B2 | 3/2013 | Wu |
| 8,800,905 B2 | 8/2014 | Lee et al. |
| D734,988 S | 7/2015 | Smith |
| D737,629 S | 9/2015 | Sands |
| 9,370,280 B2 | 6/2016 | Conti |
| 9,380,913 B2 | 7/2016 | Golino |
| 9,420,915 B2 | 8/2016 | Dickson, Jr. et al. |
| D767,334 S | 9/2016 | Pan |
| 9,687,111 B1 | 6/2017 | Trojan |
| D800,499 S | 10/2017 | Repac |
| 9,839,326 B2 | 12/2017 | Sapire |
| 9,855,535 B2 | 1/2018 | Arnett et al. |
| D822,437 S | 7/2018 | Hosey et al. |
| 10,182,682 B2 | 1/2019 | Ochoa et al. |
| 10,264,923 B2 | 4/2019 | Cartei et al. |
| 10,376,102 B2 | 8/2019 | Bock et al. |
| D859,064 S | 9/2019 | Lee et al. |
| 10,413,130 B2 | 9/2019 | Vu et al. |
| 2004/0042338 A1 | 3/2004 | Wu |
| 2007/0183256 A1 | 8/2007 | Sands |
| 2011/0248108 A1 | 10/2011 | Carriere |
| 2011/0262600 A1 | 10/2011 | McGill |
| 2013/0074706 A1* | 3/2013 | Fevre ................. A47J 43/0766 99/485 |
| 2015/0098299 A1 | 4/2015 | Sapire |
| 2017/0224168 A1 | 8/2017 | Lin et al. |
| 2018/0140137 A1 | 5/2018 | Barnard et al. |
| 2018/0236421 A1 | 8/2018 | Hoare et al. |
| 2019/0261815 A1 | 8/2019 | Elgaaen et al. |

FOREIGN PATENT DOCUMENTS

| | | | |
|---|---|---|---|
| CN | 207590559 U | * | 7/2018 |
| CN | 207590559 U | | 7/2018 |
| CN | 208435404 U | * | 1/2019 |
| CN | 208435404 U | | 1/2019 |
| CN | 208725551 U | | 4/2019 |
| EP | 2486833 A1 | | 8/2012 |
| GB | 2398733 A | | 9/2004 |
| KR | 200436671 Y1 | | 9/2007 |
| KR | 20110009558 U | | 10/2011 |
| KR | 200474168 Y1 | | 8/2014 |
| KR | 20170096383 A | | 8/2017 |
| WO | WO-2017/063962 A1 | | 4/2017 |

OTHER PUBLICATIONS

Google machine translation for "CN-208435404-U" (Year: 2019).*
International Search Report and Written Opinion (ISA/US) for PCT/US2020/025701 dated Jun. 29, 2020 (8 pages).
International Search Report and Written Opinion (ISA/CN) for PCT/CN2020/113845 dated Nov. 30, 2020 (10 pages).

* cited by examiner

BLENDER APPARATUS WITH SAFETY INTERLOCK SYSTEM

RELATED APPLICATIONS

This application is a national stage entry of International Patent Application No. PCT/CN2020/113845, filed Sep. 7, 2020, which claims priority to and the benefit of U.S. Provisional Application No. 62/897,077, filed Sep. 6, 2019, the contents of which are incorporated by this reference in its entirety for all purposes as if fully set forth herein. The application also incorporates PCT Application No. PCT/US2020/025701 filed on Mar. 30, 2020, by reference in its entirety.

TECHNICAL FIELD

The disclosure herein relates generally to household and kitchen appliances. In particular, this disclosure relates to blending devices and food processing devices having an electronic safety interlock system. More particularly, the disclosure relates to devices and apparatuses to facilitate the blending and processing of foodstuff for human consumption wherein electromotive power is utilized and thus necessitating an electronic safety interlock system being designed for incorporation into the blending device to enhance the safe operation of the blending device and reduce risk to the end-users.

BACKGROUND

Many devices used to blend food and beverages have been developed over the years. These devices commonly have features and options to suit a wide variety of food preparation and beverage making needs. An ever-increasing number of blenders appear to be that of compact, personal-size (serving one or two persons) blenders. A common feature of these personal-sized blenders is that of sealed blending in a cup shape vessel, with a blade assembly screwed, or mounted to the cup creating a liquid-tight seal. This assembly is then inverted and placed onto a blender base assembly where blending may occur. One advantage of these types of personal size closed system blenders is that a consumer can drink from the cup shape vessel directly after blending thereby reducing the need to use additional drinking containers and saving on clean up time.

These personal-size blenders commonly have a large motor and can blend hard and dense foods with relative ease due to the high power output. One problem with these blenders tends to be safety. When compact, personal-sized blenders increase power output, the higher power typically translates to increased heat output, which then leads to a risk of overheating. Such overheating can further result in the blender vessel becoming pressurized. Due to the blade assembly being mounted on the blending vessel, this built-up pressure may have no method of escape from the blender vessel other than through explosive force. Unfortunately, due to the compact size of these personal blenders, there are also few options for heat dissipation while the blenders are in operation which may preemptively reduce pressure buildup. This pressure buildup can result in a user's safety being compromised while the blender is in operation or when attempting to uncouple the blender blade holder from the blending vessel.

Potential hazards posed to a user from a pressurized blender vessel include a serious risk of explosion. Such an explosion results in burns from liquids spilling and blender parts flying off of the blender causing injury. Particularly dangerous is that of the blade holder position relative to a user, in that the blade holder can come flying off of the blender vessel first, causing lacerations and puncture wounds to those around the blender from the blender blades. Overheating can further result in permanent damage to the motor, heating the foods or liquids beyond what is desired by a consumer, and cause unpleasant smells and odors from charred motor components. When the blending vessel becomes pressurized due to heat buildup, the one safe method of opening the vessel is to wait for the heat to lower and the pressure to neutralize inside the blender vessel which only serves to further frustrate an end consumer.

Sometimes, sacrifices are made on power to save on cost as an alternative. But, these consumers still attempt to blend dense and hard foods with a blender that is underpowered for the task. Blenders that utilize a motor that is underpowered for blending such hard and dense foods may result in unsatisfactory blending and premature wear and tear on the blender parts.

Moreover, previous blenders still appear to rely on an internal blending vessel geometry which consists of four corners, points, or fins. These four areas are typically designed to narrow or constrict the blending area toward the blade in an effort to produce a vortex. The vortex is important to any decent blending process and effectively cycles blending material through the vessel. But, the above-mentioned design is an outdated method of producing a blending vortex which results in needlessly occupying space inside the blender vessel. The common personal-sized blenders suffer even further due to not having the luxury of starting with a larger-sized blender vessel initially.

SUMMARY

In various embodiments, blending devices and methods of manufacturing the same are provided. In an example embodiment, a blending device is provided. The blending device includes a blade assembly having a blade coupling structure. The blade coupling structure includes a set of blade electrical connectors. The blade electrical connectors of the set of blade electrical connectors are spaced apart from one another. The set of blade electrical connectors includes n blade electrical connectors. The blending device also includes a blender base assembly having a base coupling structure. The base coupling structure includes a plurality of base electrical connector coupler sets. Each base electrical connector coupler set includes n base electrical connector couplers. Each base electrical connector coupler set corresponds with a coupling position of the blade coupling structure and the base coupling structure. Each base electrical connector coupler set is configured to couple with the set of blade electrical connectors in a corresponding coupling position. The plurality of base electrical connector coupler sets are arranged in an alternating arrangement around the base coupling structure such that the n base electrical connector couplers of a first base electrical connector coupler set are separated by at least one base electrical connector coupler of a second base electrical connector coupler set. The blade assembly and the blender base assembly are electrically coupled in a closed configuration in which the set of blade electrical connectors is in contact with one of the plurality of base electrical connector coupler sets.

In some embodiments, the blending device remains in a protection state while in an open configuration in which the blender base assembly is powered and the blade assembly and the blender base assembly are separated. In some embodiments, the blending device includes a blender vessel configured to removably couple with the blade assembly. In such an embodiment, the blade assembly includes a vessel interlock configured to couple the blender vessel to the blade assembly. In some embodiments, the blade assembly includes one or more vessel pressure sensors configured to be engaged in an instance in which the blender vessel and the blade assembly are coupled. In such an embodiment, the blending device is electrically connected in an instance the one or more vessel pressure sensors are engaged.

In some embodiments, the blade assembly also includes a temperature sensor and the blending device is configured to operate in the protection state in an instance the temperature is above a predetermined value. In some embodiments, the blade assembly also includes a temperature sensor and the blending device is configured to operate in a protection state in an instance the temperature is above a predetermined value or the one or more of the vessel pressure sensors is not engaged.

In some embodiments, the blender base assembly includes a power switch which is configured to activate the blending device in an instance in which the blade assembly and the blender base assembly are in the closed configuration. In some embodiments, the set of blade electrical connectors includes n blade electrical connectors spaced at least approximately evenly around the blade coupling structure. In some embodiments, the set of blade electrical connectors includes two blade electrical connectors spaced approximately 180 degrees from one another around the blade coupling structure. In some embodiments, each of the plurality of base electrical connector coupler sets has two base electrical connector couplers and the base electrical connector couplers are spaced approximately 180 degrees from one another around the blender coupling structure.

In some embodiments, the blade assembly is characterized by a defined resistance signature measurable between the n blade electrical connectors, and wherein the blender base assembly includes a controller configured to measure a resistance between the n blade electrical connectors while in the closed configuration, and wherein the blending device remains in a protection state upon determining the measured resistance does not satisfy the resistance signature. In some embodiments, the resistance signature is between approximately 1.7 k$\Omega$ and approximately 55 K$\Omega$.

In some embodiments, the plurality of base electrical connector coupler sets include a first base electrical connector coupler set, and a second base electrical connector coupler set disposed circumferentially around the base coupling structure. In such an embodiment, the blade assembly and the blender base assembly include a first coupling position defined as the position in which the set of blade electrical connectors are in contact with the first base electrical connector coupler set and a second coupling position defined as the position in which the set of blade electrical connectors are in contact with the second base electrical connector coupler set. In such an embodiment, the blade assembly and the blender base assembly are electrically coupled in a closed configuration in the first coupling position or the second coupling position. In some embodiments, the plurality of base electrical connector coupler sets further include a third base electrical connector coupler set disposed circumferentially around the base coupling structure. In such an embodiment, the blade assembly and the blender base assembly also include a third coupling position defined as the position in which the set of blade electrical connectors are in contact with the third base electrical connector coupler set with the blade assembly and the blender base assembly being electrically coupled in a closed configuration in the third coupling position.

In another example embodiment, a method of manufacturing a blending device is provided. The method includes providing a blade assembly having a blade coupling structure. The blade coupling structure includes a set of blade electrical connectors and the blade electrical connectors of the set of blade electrical connectors are spaced apart from one another. The set of blade electrical connectors includes n blade electrical connectors. The method also includes providing a blender base assembly having a base coupling structure. The base coupling structure includes a plurality of base electrical connector coupler sets. Each base electrical connector coupler set includes n base electrical connector couplers. Each base electrical connector coupler set corresponds with a coupling position of the blade coupling structure and the base coupling structure. Each base electrical connector coupler set is configured to couple with the set of blade electrical connectors in a corresponding coupling position. The plurality of base electrical connector coupler sets are arranged in an alternating arrangement around the base coupling structure such that the n base electrical connector couplers of a first base electrical connector coupler set are separated by at least one base electrical connector coupler of a second base electrical connector coupler set. The blade assembly and the blender base assembly are electrically coupled in a closed configuration in which the set of blade electrical connectors is in contact with one of the plurality of base electrical connector coupler sets.

In some embodiments, the blending device remains in a protection state while in an open configuration in which the blender base assembly is powered and the blade assembly and the blender base assembly are separated. In some embodiments, the method also providing a blender vessel configured to removably couple with the blade assembly. In such an embodiment, the blade assembly includes a vessel interlock configured to couple the blender vessel to the blade assembly. In some embodiments, providing the blade assembly includes providing one or more vessel pressure sensors configured to be engaged in an instance in which the blender vessel and the blade assembly are coupled. In such an embodiment, the blending device is electrically connected in an instance the one or more vessel pressure sensors are engaged.

In some embodiments, the blade assembly also includes a temperature sensor and the blending device is configured to operate in the protection state in an instance the temperature is above a predetermined value. In some embodiments, the blade assembly also includes a temperature sensor and the blending device is configured to operate in a protection state in an instance the temperature is above a predetermined value or the one or more of the vessel pressure sensors is not engaged.

In some embodiments, the blender base assembly includes a power switch which is configured to activate the blending device in an instance in which the blade assembly and the blender base assembly are in the closed configuration. In some embodiments, the set of blade electrical connectors includes n blade electrical connectors spaced at least approximately evenly around the blade coupling structure. In some embodiments, the set of blade electrical connectors includes two blade electrical connectors spaced approximately 180 degrees from one another around the blade coupling structure. In some embodiments, each of the plurality of base electrical connector coupler sets has two base electrical connector couplers and the base electrical connector couplers are spaced approximately 180 degrees from one another around the blender coupling structure.

In some embodiments, the blade assembly is characterized by a defined resistance signature measurable between the n blade electrical connectors, and wherein the blender base assembly includes a controller configured to measure a resistance between the n blade electrical connectors while in the closed configuration, and wherein the blending device remains in a protection state upon determining the measured resistance does not satisfy the resistance signature. In some embodiments, the resistance signature is between approximately 1.7 kΩ and approximately 55 KΩ.

In some embodiments, the plurality of base electrical connector coupler sets include a first base electrical connector coupler set, and a second base electrical connector coupler set disposed circumferentially around the base coupling structure. In such an embodiment, the blade assembly and the blender base assembly include a first coupling position defined as the position in which the set of blade electrical connectors are in contact with the first base electrical connector coupler set and a second coupling position defined as the position in which the set of blade electrical connectors are in contact with the second base electrical connector coupler set. In such an embodiment, the blade assembly and the blender base assembly are electrically coupled in a closed configuration in the first coupling position or the second coupling position. In some embodiments, the plurality of base electrical connector coupler sets further include a third base electrical connector coupler set disposed circumferentially around the base coupling structure. In such an embodiment, the blade assembly and the blender base assembly also include a third coupling position defined as the position in which the set of blade electrical connectors are in contact with the third base electrical connector coupler set with the blade assembly and the blender base assembly being electrically coupled in a closed configuration in the third coupling position.

This disclosure herein may also relate to a blending device which may include a blender vessel, a blade assembly, a blender base assembly, and a thermal detector, each of which may contribute to an interlock system and assembly. The thermal detector may be configured to be in detective proximity with a matter being blended and the matter being blended may include a wide variety of foodstuffs meant for human consumption. The interlock system and assembly may further include blade electrical connectors and a compressive contact. The blender vessel may be configured to compress the compressive contact to a communicative configuration when reversibly engaged with the blade assembly. The interlock system and assembly may further utilize a blender base assembly which has a plurality of base electrical connector coupler sets and a motor. The blade assembly may be configured to releaseably mount to the blender base assembly and in doing so may cause one of the base electrical connector coupler sets and the blade electrical connectors to come into electrical communication with each other. Accordingly, the interlock system and assembly may result in the motor being obstructed from being in electricity-receiving communication with a power source.

This disclosure may also describe a food processing device, additionally referred to as a blending device, which may have an electrical interlock system which may have a blender vessel and a blade assembly. The blade assembly may have a housing logic circuit element, a compressive contact, and blade electrical connectors. The blender vessel may be configured to reversibly engage with the compressive contact, and the compressive contact may be biased to an off configuration when not reversibly engaged to the blender vessel, and biased to an on configuration when reversibly engaged to the blender vessel. The reversible engagement may cause the compressive contact to transition to an on configuration. The transitioning may permit an electric signal to be transmissible to the housing logic circuit element. The blade assembly may further have a thermal detector. The thermal detector may be located in detective proximity with a blending matter and configured to be in electrical communication with the housing logic circuit element. The food processing device may also have a blender base assembly which may include a motor, a plurality of base electrical connector coupler sets, and a one or more than one logic circuit element. The blender base assembly may be configured to reversibly couple with the blade assembly. The reversible coupling may result in the blade electrical connectors being in electronic communication with one of the base electrical connector coupler sets. The interlock assembly and system may result in a configuration for the motor which may result in operability when the compressive contact is configured to on, the thermal detector registers a temperature below a thermal maximum, and the blade electrical connectors and one of the base electrical connector coupler sets are in the aforementioned electronic communication with each other.

BRIEF DESCRIPTION OF THE DRAWINGS

Further advantages of the present disclosure may become apparent to those skilled in the art with the benefit of the following detailed description of the preferred embodiments and upon reference to the accompanying drawings in which.

DETAILED DESCRIPTION OF THE PREFERRED EMBODIMENTS

Figure 1:
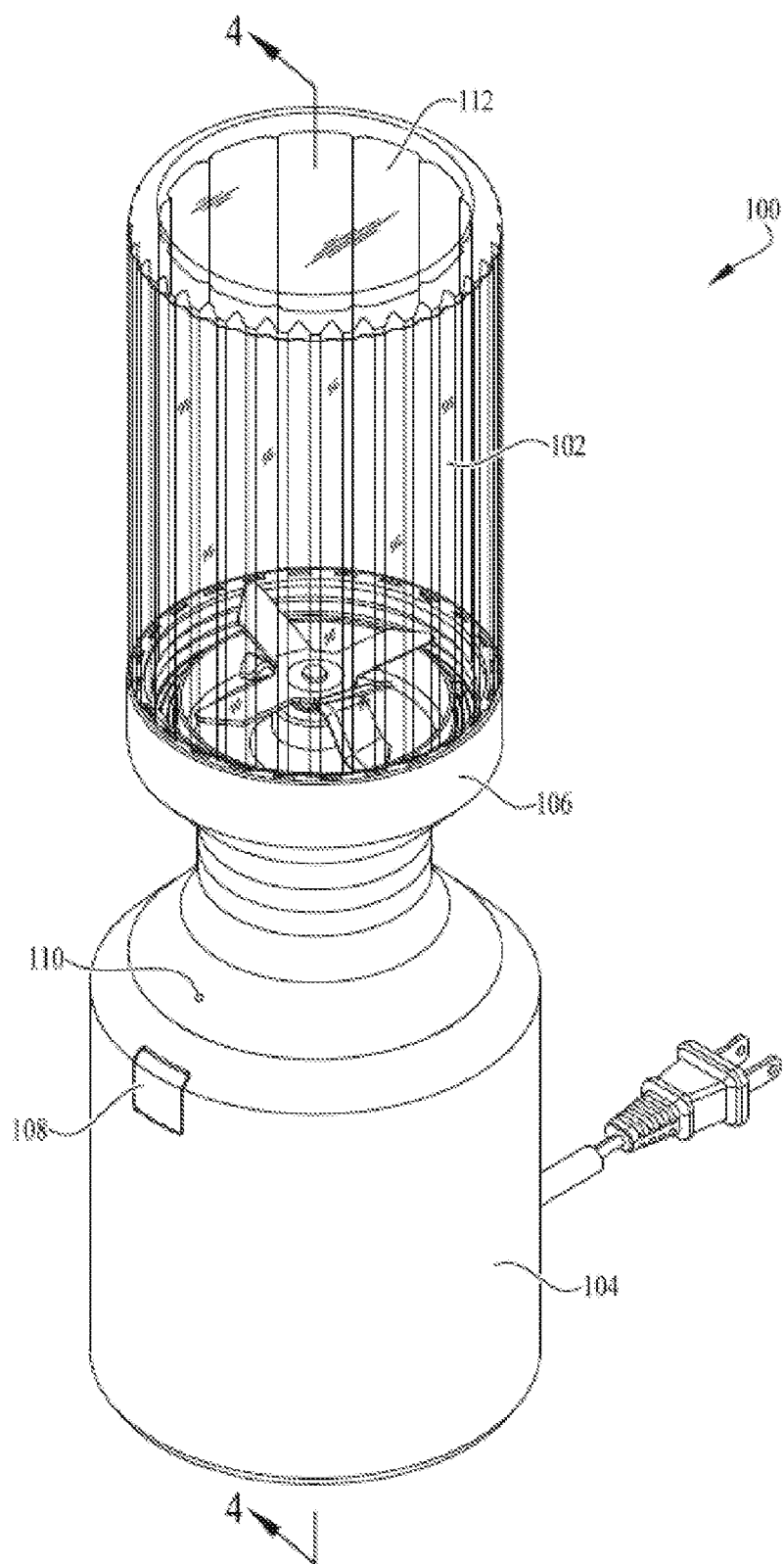
FIG. 1 is a perspective view of one non-limiting embodiment of a blending appliance.

Referring now to the drawings, like reference numerals designate identical or corresponding features throughout the several views. Further, described herein are certain non-limiting embodiments of a blending device 100.

FIG. 1 shows relevant portions of the blending device 100 which may include a blender vessel 102, a blender base assembly 104 (also referred to herein as blender base 104), a blade assembly 106 (also referred to herein as a blade housing 106), a power switch 108, and a status indicator 110. The blender base assembly 104 may be fully detachable with respect to the blade assembly 106 and the blender vessel 102. Further, the blender vessel 102 and the blade assembly 106 may be detachable from each other. The power switch 108 provides an on-off function with full depression for the blending device 100 and may further enable a pulsing function by half depression, quarter depression, or any fraction of depression other than full depression. In this way, the blending device 100 may be fully controlled in an instant on or instant off manner. Other methods of operation, as addressed below, are also contemplated. The status indicator 110 may indicate the state of the blending device 100 by indicating power is on, power is off, the power is used in a pulsing manner, or the power and thus the food blending device 100 is on standby. Further, the status indicator 110 may utilize a variety of lighting color schemes and/or light flashes for indicating the state of the blending device 100. The status indicator 110 may utilize light-emitting diodes for light production. The blender vessel 102 is contemplated to have a viewport 112 at approximately the center of one side of the blender vessel 102. This may allow users of the food blending device 100 to view the material as it is being processed and blended. In various embodiments, the status indicator 110 may be configured to display a plurality of colors. In various embodiments, the status indicator 110 may be configured to display at least one of a solid or flashing light. In various embodiments, the combination of color and frequency may determine the status of the blending device. For example, in an example embodiment, the status indicator may be off in an instance the unit is off; the status indicator may be solid amber in an instance in which the unit is on but the interlock is not connected; the status indicator may be solid white in an instance the unit is on and ready to blend; the status indicator may be solid green in an instance blending is in progress; the status indicator may be flashing amber in an instance the motor is overloaded, and the status indicator may be flashing red in an instance in which the substance in the blending device is too hot. Various embodiments may employ different or additional different notifications using different colors or blinking frequency.

Blender vessel 102 is contemplated to be constructed of glass, borosilicate glass, polycarbonate, or any number of suitable plastics or thermoplastics such as co-polymers or co-polyesters, for example, polyethylene terephthalate or a combination assembly of plastic or thermoplastic or any combination therein. The blender base assembly 104, blade assembly 106, and blender blade 114 are contemplated to be constructed of a wide range of suitable lightweight materials, for example, plastics, thermoplastics, or a combination therein, and metals such as aluminum, zinc, or titanium. The blender blade 114 specifically may be constructed of more durable and heavyweight materials such as, but not limited to, stainless steel.

Figure 2:
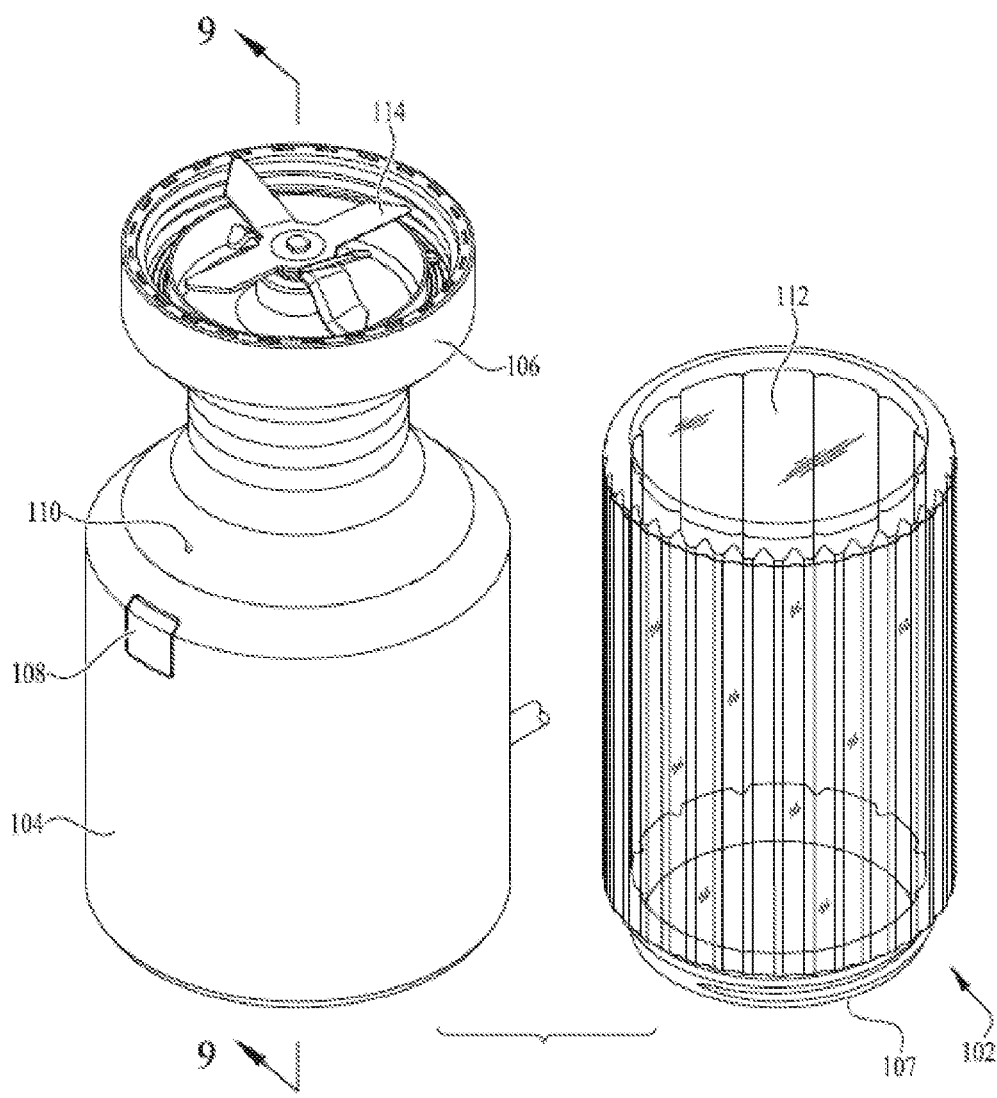
FIG. 2 is a perspective view of one non-limiting embodiment of a blending appliance with a blending vessel removed illustrating a blending blade.

FIG. 2 shows all of the preceding aspects and further illustrates the blender vessel 102 in a fully detached configuration from the blade assembly 106. The illustrated removal of the blender vessel 102 better illustrates the location of blender blade 114 as it may relate to the blender vessel 102. The blender vessel 102 and the blade assembly 106 may join together by way of threading located to one respective end of each of the blender vessel 102 and the blade assembly 106. Further illustrated is that of the threaded end 107 of the blender vessel 102. The threading illustrated is by way of example only, and other connection methods are contemplated between the blender vessel 102 and the blade assembly 106, including clip type connection, bayonet type connection, friction fit type connections and other connections commonly used in the industry.

Figure 3:
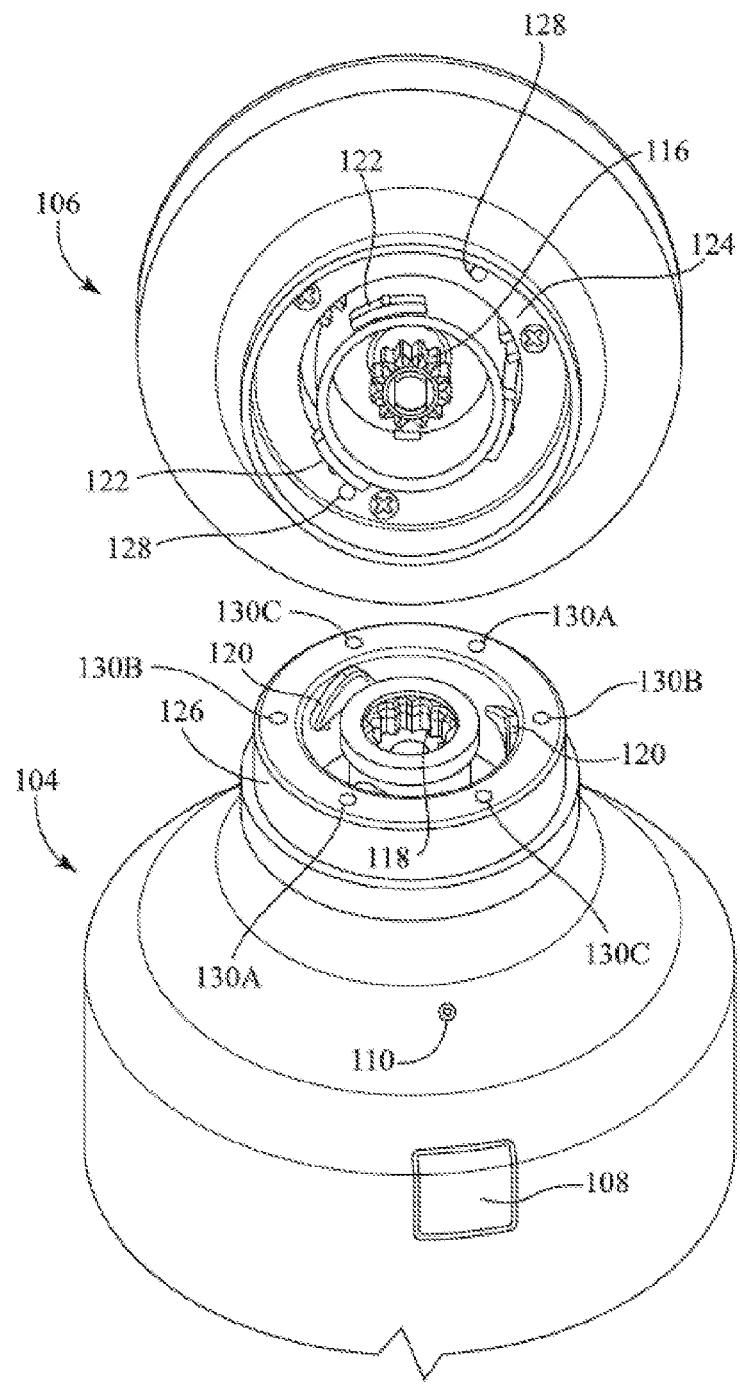
FIG. 3 is a perspective top view of a blending appliance base and a perspective bottom view of a blending blade assembly illustrating one potential mating between a blending base and a blending blade assembly.

FIG. 3 illustrates the blade assembly 106 lifted off of the blender base assembly 104. Illustrated on the blade assembly 106 is a male spline 116 and illustrated on the blender base assembly 104 is a female spline 118. This configuration may be contemplated to be in the reverse with the male spline 116 located to the blender base assembly 104 and the female spline 118 located to the blade assembly 106. The male spline 116 and the female spline 118 may mate together to provide rotational coupling between male spline 116 and female spline 118 which may be directly connected to the blender blade 114 (shown in FIG. 2).

Further illustrated in FIG. 3 are bayonet connectors 120 located to the blender base assembly 104 and locking protrusions 122 located to the blade assembly 106. The bayonet connectors 120 may permit alignment with the blender base assembly 104 and the locking protrusions 122 of the blade assembly 106 from any particular direction of application of blade assembly 106 to blender base assembly 104. The locking protrusions 122 may have any orientation with respect to the blender base assembly 104 and the bayonet connectors 120. The bayonet connectors 120 may cause a rotational auto-alignment between the blender base assembly 104 and blade assembly 106 such that the blade assembly 106 may rotate based on the downward slope of the bayonet connectors 120, based on the triangular shape of the bayonet connectors 120. Further, any shape for the bayonet connectors 120 are contemplated provided that a similar rotational auto-alignment feature may be achieved, for example, a half-circle.

An outer collar 124 may aid in guiding the blender base assembly 104 and the blade assembly 106 together such that the bayonet connectors 120 and the locking protrusions 122 may properly align for preparation of the auto-alignment. However, it should be understood that other alignment configurations may be provided in certain embodiments. The outer collar 124 may fit around neck 126 such that the connection between the blender base assembly 104 and the blade assembly 106 may be secure and stable. After mounting the outer collar 124 of the blade assembly 106 over the neck 126 of the blender base assembly 104, the bayonet connectors 120 and the locking protrusions 122 may engage and auto-rotate the blade assembly 106 around the blender base assembly 104 permitting the blade assembly 106 to drop fully to the blender base assembly 104. A user then may lock the blade assembly 106 and the blender base assembly 104 together by twisting the blade assembly 106 with the blender vessel 102 attached to the blender vessel 102 such that the twisting motion locks the locking protrusions 122 under the bayonet connectors 120 of the blender base assembly 104.

Still referring to FIG. 3, shown are blade electrical connector 128 and a plurality of base electrical connector coupler sets 130A-130C. The blade electrical connector 128 and each of the base electrical connector coupler sets 130A-130C may be electronically conductive and thus may enable passage of current therebetween when in contact with one another.

As illustrated, the blade electrical connectors 128 are embodied as electrically conductive pins protruding from a bottom surface of the blade assembly 106, and the plurality of base electrical connector coupler sets 130A-130C each comprise a plurality (e.g., two, as illustrated) of electrically conductive pads that are at least substantially planar with an upper surface of the base assembly 104. However, it should be understood that such a configuration may be reversed (with the blade electrical connectors 128 being embodied as pads and the base electrical connector coupler sets 130A-130C being embodied as a plurality of electrically conductive pins). Such configurations facilitate contact between the blade electrical connectors 128 and corresponding ones of the base electrical connector coupler sets 130A-130C while the blade assembly 106 is coupled with the base assembly 104.

Figure 9:
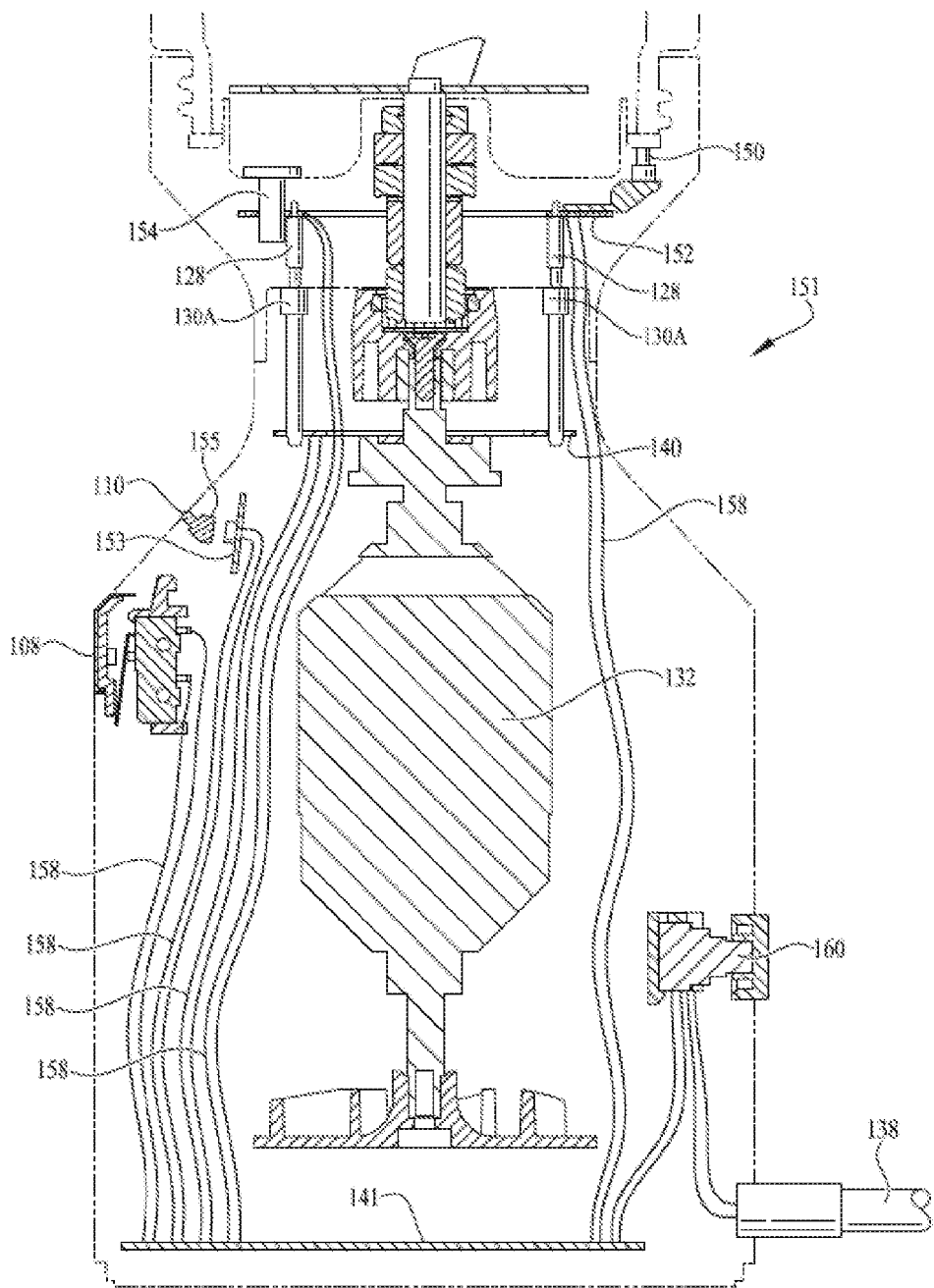
FIG. 9 is an enlarged diagrammatic cross-sectional view illustrating one non-limiting embodiment of an electronic interlock system.

Together, the base electrical connector coupler sets 130A-130C and the blade electrical connectors 128 may form a portion of the electronic interlock system 151 (shown in FIG. 9). When the blade electrical connectors 128 and one of the base electrical connector coupler sets 130A-130C are mated together and electronically connected, the electronic interlock system 151 (shown in FIG. 9) may then be placed closer to an operational status which represents the full operation of the blending device 100 and may further be indicated to do so by status indicator 110. Accordingly, one potential indicator of this may be that the status indicator 110 may become illuminated with a color that may be unique to this operational status.

In various embodiments, the blade assembly 106 may include a set of blade electrical connectors 128 disposed around on the blade coupling structure. As shown in FIG. 3, the blade coupling structure may be a portion of the blade assembly configured to couple with the base assembly 104 (e.g., the blade coupling structure includes the outer collar 124). In various embodiments, the set of blade electrical connectors 128 may include n blade electrical connectors (in the illustrated embodiment, the set of blade electrical connectors 128 is embodied as two blade electrical connectors 128. These blade electrical connectors 128 may be connected in series (e.g., together with one or more sensors or other electronics of the blade assembly 106, as discussed herein). In various embodiments, the blade electrical connectors 128 may be spaced apart from one another. In various embodiments, the blade electrical connectors 128 may be approximately evenly spaced around the blade coupling structure. For example, in an instance in which the set of blade electrical connectors 128 include two blade electrical connectors, the blade electrical connectors 128 may be approximately 180 degrees from one another.

In various embodiments, the blender base assembly 104 may include a plurality of base electrical connector coupler sets (e.g., sets 130A, 130B, 130C) disposed on a top surface of the base coupling structure and spaced around the base coupling structure. As shown in FIG. 3, the base coupling structure may be a portion of the base assembly configured to couple with the blade assembly 106 (e.g., the base coupling structure may include neck 126). Each base electrical connector coupler set 130A-130C may be parallel relative to other sets. Each base electrical connector coupler set comprises a plurality (e.g., two) base electrical connector couplers that are connected in series relative to other base electrical connector couplers within the same base electrical connector coupler set.

In various embodiments, each base electrical connector coupler set may include the same number of base electrical connector couplers as the number of blade electrical connectors 128 of the blade assembly 106. For example, each base electrical connector coupler set may have n base electrical connector couplers. In the specific embodiment, each base electrical connector coupler set may have two base electrical connector couplers provided to contact and form an electrical connection with the respective two blade electrical connectors 128 of the blade assembly 106.

In various embodiments, the electrical couplers within each base electrical connector coupler set may be spaced the same distance as the blade electrical connectors 128 of the blade assembly 106 such that the blade electrical connectors 128 and the electrical couplers of a single base electrical connector coupler set may be in contact to form an electrical connection therebetween while the blade assembly 106 is connected with the base assembly 104. For example, as shown in FIG. 3, in an instance the blade assembly 106 includes two blade electrical connectors 128 spaced at approximately 180 degrees, each of the base electrical connector coupler sets may be spaced at approximately 180 degrees apart (e.g., the base electrical connector coupler set 130A are spaced approximately 180 degrees from one another).

In various embodiments, the plurality of base electrical connector coupler sets 130A, 130B, 130C may each correspond to a coupling position of the blender base assembly 104 and the blade assembly 106. In an example embodiment, the blending device may be in the closed position in an instance in which each blade electrical connector 128 of the blade assembly 106 is in contact with a base electrical connector coupler of the same base electrical connector coupler set. For example, the blending device 100 may be in the closed configuration in an instance in which each blade electrical connector 128 is in contact with either the first base electrical connector coupler set 130A, the second base electrical connector coupler set 130B, or the third base electrical connector coupler set 130C. Alternatively, the blending device may be in an open configuration in an instance in which every blade electrical connector 128 is not in contact with the same base electrical connector coupler set. For example, if one of the blade electrical connectors is in contact with an base electrical connector coupler of the first base electrical connector coupler set 130A and another blade electrical connector is not in contact with another base electrical connector coupler of the first base electrical connector coupler set 130A, then the blending device 100 may be in the open configuration. In various embodiments, in an instance in which the blending device is in the open configuration, the blending device may operate in a protection state. In various embodiments, the blade assembly may not receive power in an instance in which the blending device 100 is in the protection state.

In an example embodiment, the blending device 100 may include a first coupling position defined as the position in which the set of blade electrical connectors 128 are in contact with the first base electrical connector coupler set 130A. In some embodiments, the blending device 100 may also include a second coupling position defined as the position in which the set of blade electrical connectors 128 are in contact with the second base electrical connector coupler set 130B. In some embodiments, the blending device 100 may also include additional coupling positions defined as the position in which the set of blade electrical connectors 128 are in contact with an additional base electrical connector coupler set (e.g., a third coupling position may be defined as the position in which the set of blade electrical connectors 128 are in contact with the third base electrical connector coupler set 130C). In various embodiments, the blending device 100 may be configured to deactivate the protective state in an instance in which the blending device is in one of the coupling positions (e.g., the first coupling position or the second coupling position). In various embodiments, the blending device 100 may have at least two coupling positions. In various embodiments, the blending device 100 may have more than two coupling positions based on the number of base electrical connector coupler sets (e.g., in an instance there are three base electrical connector coupler sets, there may be three coupling positions).

In various embodiments, the blending device 100, such as the blender base assembly 104, may include a controller configured to measure a resistance between the plurality of blade electrical connectors 128. The controller may be provided as a circuit (or portion thereof, including, for example, one or more integrated circuit chips provided on a Printed Circuit Board (PCB). The controller is configured to ensure the blending device 100 remains in a protection state unless and until the controller can confirm that the blade assembly 106 is properly secured relative to the base assembly 104, and any safety sensors included within the blade assembly 106 (e.g., one or more vessel pressure sensors utilized to ensure that a vessel is secured onto the blade assembly 106, one or more temperature sensors utilized to ensure the temperature of material within the vessel-blade assembly 106 are within a safe range (e.g., below a threshold temperature, and/or the like). The controller may determine a measured resistance across each set of base electrical connector coupler set 130A-130C to ensure that the blending device 100 is in a safe configuration for operation. Said differently, the controller may determine a measured resistance between the base electrical connector couplers within each base electrical connector coupler set (e.g., measuring a resistance between the two base electrical connector couplers within a first base electrical connector coupler set 130A; measuring a resistance between the two base electrical connector couplers within a second base electrical connector coupler set 130B; and measuring a resistance between the two base electrical connector couplers within a third base electrical connector coupler set 130C of the illustrated embodiments). These measured resistance values are compared against a stored resistance signature (e.g., a range of acceptable measured resistance values indicated as indicative of a safe operating condition of the blending device 100), and the blending device 100 may be configured to remain in a protection state until an instance in which the resistance signature is satisfied. For example, the resistance signature may be satisfied in an instance in which the resistance is between approximately 1.7 k$\Omega$ to and approximately 55 K$\Omega$. In various embodiments, the resistance signature may correspond to an expected resistance measured between base electrical connector couplers within an base electrical connector coupler set when the base electrical connector couplers are in electrical contact with the blade electrical connectors 128 of the blade assembly, and any safety-related sensors within the blade assembly have a collective measured resistance indicative of respective determined safe operation states.

As a non-limiting example, in an embodiment in which the blade assembly 106 comprises one or more vessel pressure sensors indicating whether a vessel is connected with the blade assembly and a temperature sensor indicating whether matter within the vessel-blade assembly 106 is at a safe blending temperature (e.g., below a threshold), each of the vessel pressure sensors and the temperature sensors may be characterized as configured between one or more measured resistance values. For example, the vessel pressure sensors may be configured between a first resistance value while a vessel is not connected, and a second resistance value while a vessel is connected with the blade assembly 106. Similarly, the temperature sensor may be characterized by a first resistance value (or first range of resistance values) while the temperature of matter within the vessel-blade assembly 106 is not at a safe blending temperature, and a second resistance value (or second range of resistance values) while the temperature of matter within the vessel-blade assembly 106 is at a safe blending temperature. These resistance values may be additive from the perspective of the controller, such that the controller may be configured to measure a collective resistance value of these sensors when measuring a resistance between pairs of connector couplers within a single base electrical connector coupler set. The resistance signature may correspond to an instance in which the vessel pressure sensors are characterized by a measurable resistance of the second resistance value (or within a second resistance value range), and the temperature sensor is characterized by a measurable resistance within the second resistance range. Since the resistance value is measured across each base electrical connector coupler set 130A-130C, the resistance value across a single blade electrical connector set may only be measurable to be within the acceptable range of the stored resistance signature if the base electrical connector couplers within a single blade electrical connector set are sufficiently connected with the blade electrical connectors 128 of the blade assembly 106.

In certain embodiments, a temperature-based shut-off of the blending device 100 (e.g., entry into protection mode), may additionally require a specific procedure for resetting the controller to enable the controller to deactivate the protection mode. For example, upon the controller determining that a temperature exceeds a temperature threshold (e.g., based on measured resistance values attributable to the temperature sensor and/or to the blade assembly 106 overall), the controller may be configured to maintain the protection mode until the blending device 100 has been turned off and on again (e.g., using switch 160), and the temperature is within a determined safe temperature range (e.g., based on a measured temperature and/or resistance of the temperature sensor) when the blending device 100 is turned on.

Figure 4:
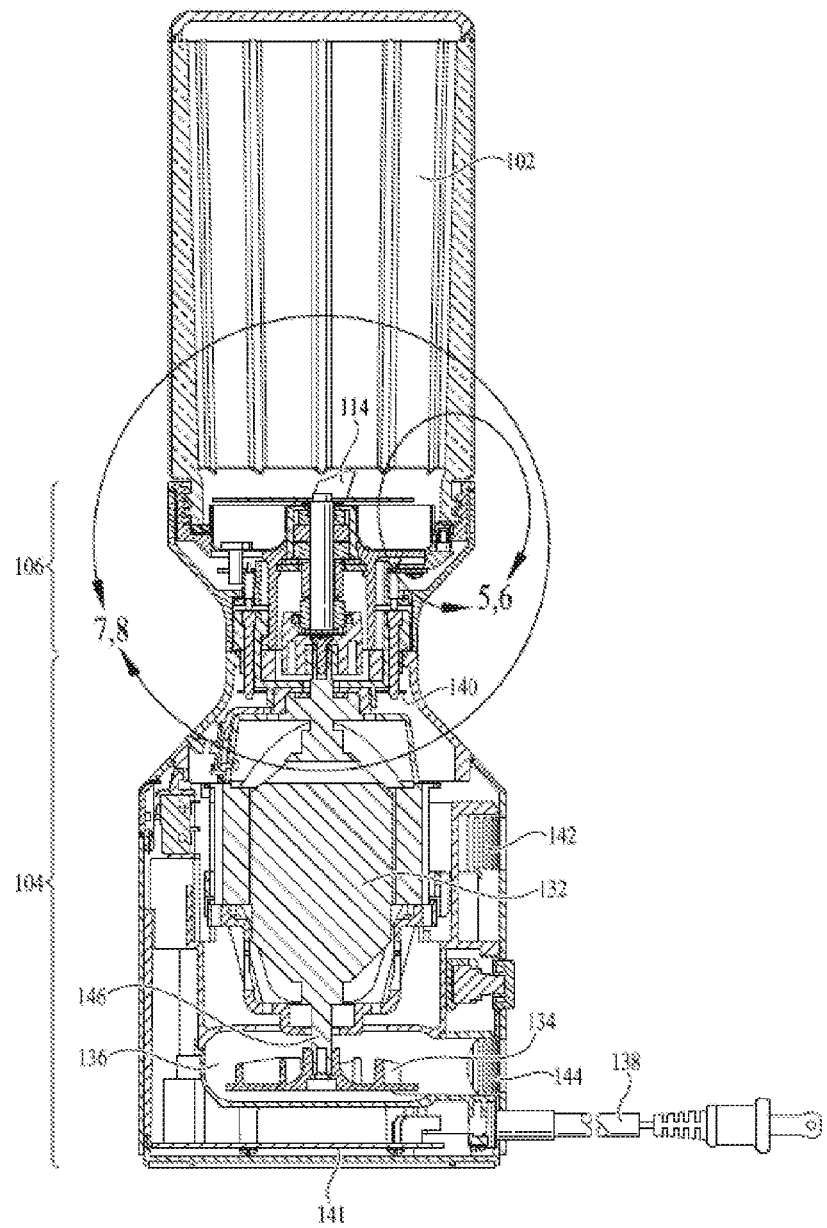
FIG. 4 is a cross-sectional view of a food blending device in an assembled configuration.

By utilizing a resistance signature to ensure proper connection between the blade assembly 106 and the base assembly 104, and to ensure that any safety-related sensors are in a determined safe configuration, the controller is additionally configured to ensure that false positive determinations of connections between base blade electrical connectors within a base blade electrical connector set 130A-130C cannot result in a false determination of a safe operating condition for the blending device 100. For example, foreign substances (e.g., food, water, liquid, and/or the like) on the upper surface of the neck 126 of the base that have at least minimal conductive properties may create a short circuit (or a complete circuit with a low resistance value) if the foreign substance connects at least two base electrical connector couplers. Because the base electrical connector coupler sets are spaced around the neck 126 in an alternating arrangement (such that adjacent base electrical connector couplers are not part of the same base electrical connector coupler set) and such that base electrical connector couplers within a single base electrical connector coupler set are spaced far apart from one another (e.g., 180 degrees relative to one another around the neck 126), it is unlikely that any foreign substances would create a complete circuit (e.g., a short circuit or a circuit with a low resistance) between base electrical connector couplers within a single base electrical connector coupler set. Such spacing and alternative arrangement of base electrical connector coupler sets thereby minimizes a likelihood of an undesired and unintentional completion of a circuit detectable by the controller. Moreover, even in the unlikely event that a foreign substance does create a complete circuit between base electrical connector couplers within a single base electrical connector coupler set, the controller compares a measured resistance across the base electrical connector couplers against the above-mentioned resistance signature to determine whether the measured resistance satisfies the stored resistance signature. In the event that a foreign substance completes a circuit between the base electrical connector couplers of a single base electrical connector coupler set, the measured resistance likely will not satisfy the stored resistance signature, and the controller will maintain the blending device 100 in the protection state. FIG. 4 indicates the internal components of the food blending device 100. Seen in conjunction with some previously illustrated components are a motor 132, a fan 134, a fan housing 136, and a power source 138 (power source may also herein be referred to as a power cord 138). The power source 138 may be a hard-wired cord, a removable cord that plugs into both the blender base assembly 104 and a standard wall outlet or battery pack, or any combination therein. The motor 132 may be contemplated to provide a wide range of power outputs, by way of example only, 300, 1000 or 1500 watts or any selected power rating inside or outside the stated range. Moreover, motor 132 may be contemplated to be brushless or may also be a brushed design. In some embodiments, the motor 132 may be 1000 watts and of a brushless configuration.

Further illustrated is a first logic circuit element 140 (also referred to as a first printed computer board 140) and a second logic circuit element 141 (also referred to as a second printed computer board 141). The first logic circuit element 140 and second logic circuit element 141 may support and electrically connect mechanical and/or electronic/electrical components using conductive tracks, pads, and other features and may be further etched from one or more sheet layers of copper laminated onto and/or between sheet layers of a non-conductive substrate as would be readily understood by those skilled in the art of manufacturing printed computer boards. Moreover, the first logic circuit element 140 and the second logic circuit element 141 may route signals coming from power switch 108, may route signals from various sensors of the food blending device 100, may route signals from an electronic interlock system 151 (illustrated in FIG. 9) and may generally connect electronic components of the blending device 100 together. Further, any identified printed computer board throughout this disclosure may be programmed to perform a wide variety of functions as related to blending.

The intake port 142 to the fan and the exhaust port 144 are further indicated in FIG. 4. The motor 132 may have a drive shaft 146 which may run through the motor 132. The drive shaft 146 may operate the fan 134 and the blender blade 114 simultaneously. The blender blade 114 may be driven by the female spline 118 which may be attached to the upper end of the drive shaft 146. The fan 134 may drive air current out of the exhaust port 144 thereby creating a vacuum towards the upper portion of the blender base assembly 104. The produced vacuum may then result in such decreased air pressure that air is then pushed into the intake port 142 by the ambient air pressure external to the blender base assembly 104. With continuous operation of the food blending device 100 via the motor 132 the air path (shown in FIG. 11) is thus circulated through the blender base assembly 104 to maintain appropriate operating temperatures for the blender base assembly 104 and the motor 132.

Figure 5:
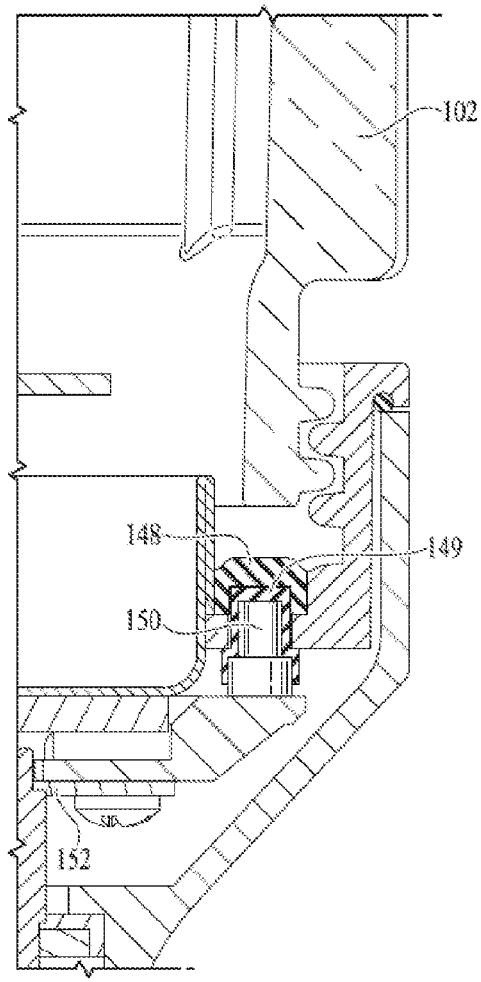
FIG. 5 is an enlarged portion of FIG. 4 wherein a compressive contact between a blender vessel and a blade assembly is in a disengaged configuration.
Figure 6:
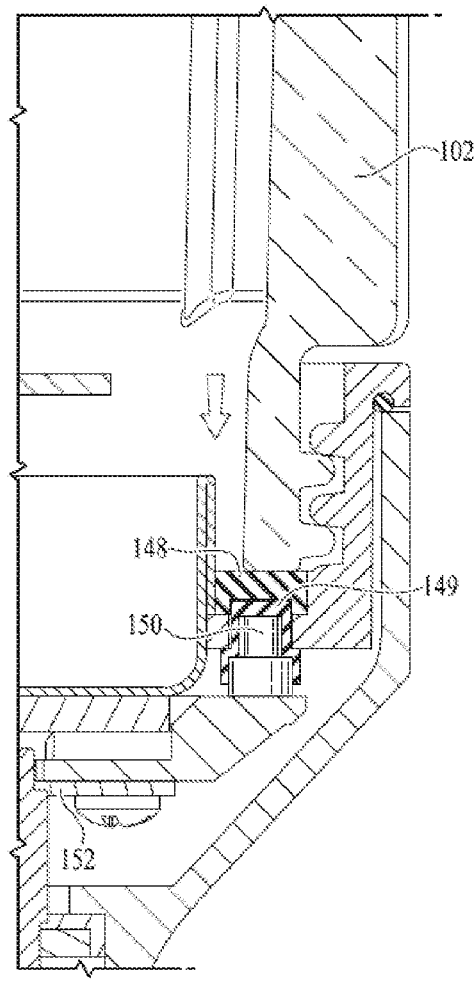
FIG. 6 is an enlarged portion of FIG. 4 wherein a compressive contact between a blender vessel and a blade assembly is in an engaged configuration.

FIGS. 5 and 6 illustrate how a portion of an electronic interlock system 151 (illustrated in FIG. 9) may operate. Seen in FIG. 5 is silicone gasket 148 located in a superior position to an actuator 149, which may be located in a superior position to a vessel pressure sensor (e.g., compressive contacts 150, also referred to herein as spring loaded electrical contacts 150). The actuator 149 may be ring shaped and be circumferentially positioned between the silicone gasket 148 and the compressive contact 150. The blender vessel 102 may be threaded onto the blade assembly 106 which may depress the silicone gasket 148 and thereby depress the actuator 149 and the compressive contact 150 as illustrated in FIG. 6. Depression of the compressive contact 150 may result in a complete circuit with respect to the blender vessel 102 and the blade assembly 106 and communicate electronically with a housing logic circuit element 152 (also referred to herein as a housing printed computer board 152), which may then communicate with the other printed computer boards located to the blender base assembly 104 (shown in FIGS. 4 and 9). Further contemplated is that printed computer board 152 may, or may not have further programming, or may merely route electrical signals to other printed computer boards described herein. Any identified printed computer board throughout this disclosure may be programmed to perform a wide variety of functions as related to blending.

Figure 7:
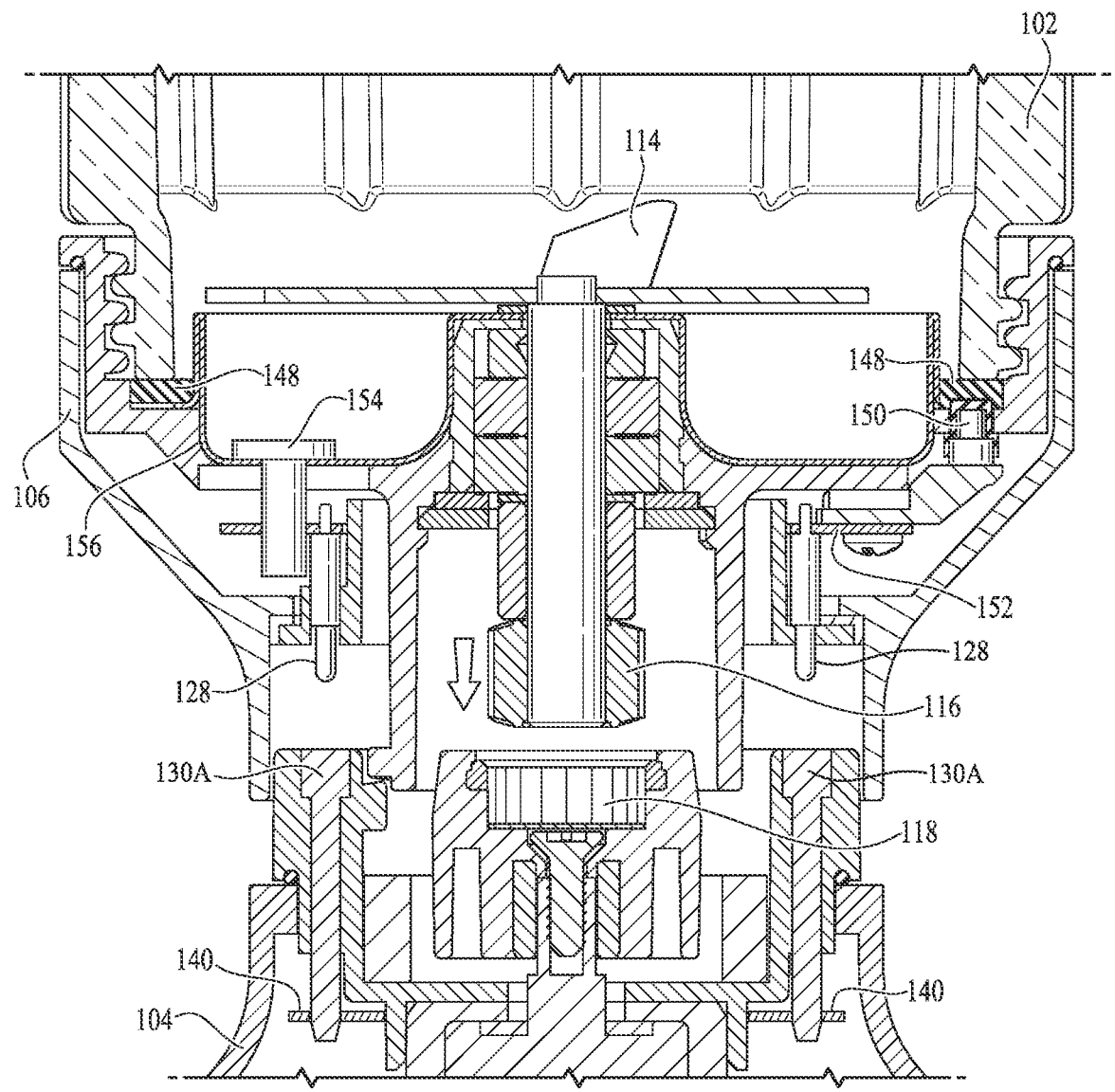
FIG. 7 is an enlarged portion view of FIG. 4 illustrating a disengaged coupling of a blender base assembly and a blade assembly.
Figure 8:
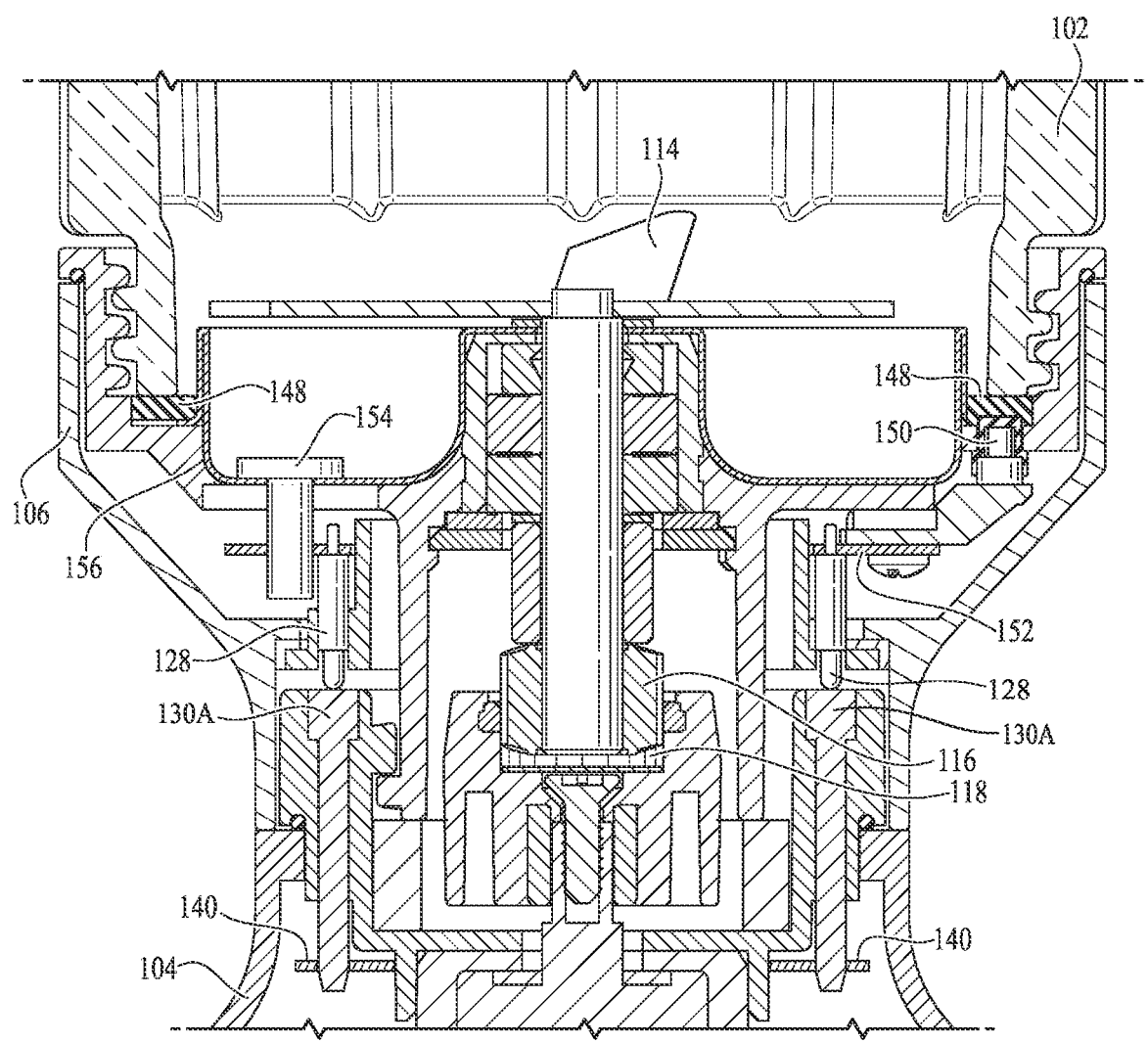
FIG. 8 is an enlarged portion view of FIG. 4 illustrating an engaged coupling of a blender base assembly and a blade assembly.

FIGS. 7 and 8 illustrate one potential embodiment of how the blender base assembly 104 and the blade assembly 106 may couple together for operation. Shown in FIG. 7 is a downward application of the blade assembly 106 to the blender base assembly 104. The male spline 116 of the blade assembly 106 may slot into the female spline 118 of the blender base assembly 104 as illustrated in FIG. 8. In this way, the motor 132 may then be physically and rotationally coupled with the shaft of the blender blade 114. Shown in FIG. 8 is contact between blade electrical connectors 128 and one of the plurality of base electrical connector coupler sets 130A-130C. Such contact may be important for the electronic interlock system 151 (shown in FIG. 9).

Further illustrated is the thermal detector 154 located immediately adjacent to, and in a superior position with a lower wall 156 of the blade assembly 106. The proximity of the thermal detector 154 to the internally blended contents of the blender vessel 102 and blade assembly 106 may be used due to the accuracy of the readings while the blending device 100 is in operation. The thermal detector 154 may be physically connected to the housing logic circuit element 152 with conductive wiring such that the thermal detector 154 is connected to the electronic interlock system 151 (shown in FIG. 9). The thermal detector 154 may shut off the blending device 100 should a thermal maximum be reached. In doing so, the thermal detector 154 may be electrically conductive with blade electrical connectors 128 (shown in FIG. 3) and the base electrical connector coupler sets 130A-130C (shown in FIG. 3) such that a thermal maximum signal can be routed from thermal detector 154 to an appropriate printed computer board for power shut off. The thermal maximum may be any temperature predetermined by the manufacturers, for example, 60 to 100 degrees centigrade. Example embodiments may shut off power to blending device 100 between 65 and 75 degrees centigrade. In some embodiments, the thermal detector 154 may be contemplated to be a negative temperature coefficient thermistor. Other thermal detectors are contemplated, by way of example, a positive temperature coefficient thermistor, or any other variety of temperature detectors of which the resistance may be altered from ambient environmental temperature.

In various embodiments, the thermal detector 154 may be configured to measures the temperature of the substance (e.g., food/liquid/smoothie/etc.) in the blender vessel 102. In an instance in which the substance in the blender vessel 103 gets too hot, then the thermal detector 154 may cause the blender to stop. For example, the resistance of the thermal detector may change sufficiently such that the controller shuts off the blending device (e.g., the thermal detector causes the resistance to be outside of the resistance signature and the controller puts the blending device into the protection state). In some embodiment, multiple thermal detectors may be used to monitor the temperature of the substance in the blender vessel 102 at different location.

In various embodiments, a temperature sensor (e.g., an additional thermal detector not shown) proximate to the motor may be configured to shut off the blending device 100 in an instance in which the blender vessel 102 is too full with a substance to be blended, the substance to be blended is too tough or hard, the blade is jammed during blending, and/or the like. For example, the temperature of the motor in the blender base assembly 104 may increase in one of the above fault states, which causes the temperature sensor to reach a maximum allowable temperature for operation thereof (e.g., the maximum allowable temperature may establish a motor temperature cutoff threshold that may be utilized by the controller to enable a protection state upon determining the motor temperature exceeds the maximum allowable temperature). In various embodiments, in an instance the motor in the blender base assembly 104 gets sufficiently hot such that the temperature sensor reaches the maximum allowable temperature, the power to the motor may be cut, (e.g., by the controller activating the protection state of the blending device 100) such that the motor may stop. In some embodiments, the base assembly 104 may have one or more speed sensors (e.g., a hall-effect sensor measuring movement of magnetic rotors within the motor) disposed proximate to the motor, such that the speed sensor measures the speed of the motor. In such an embodiment, the speed sensor may be in communication with the PCB, such that a signal may be transmitted to the PCB. In various embodiments, in an instance the PCB receives a signal indicating the motor speed has slowed and/or stopped, the PCB may be configured to change the status indicator 110 to indicate a fault (e.g., an overload condition) has occurred.

Illustrated in FIG. 9 is an electronic interlock system 151. The components, as listed, may constitute the system as a whole, in partial, or less than the whole. Such components are the power switch 108, the status indicator 110, the blade electrical connectors 128, the plurality of base electrical connector coupler sets 130A-130C, the motor 132, the power source 138, a first logic circuit element 140, a second logic circuit element 141, compressive contact 150, housing logic circuit element 152, indicator logic circuit element 153 (also herein referred to as an indicator printed computer board 153), thermal detector 154, light pipe 155, wiring 158, and power cut switch 160. Accordingly, this list may not be exhaustive, nor is this list fully inclusive. Additional components are contemplated to be added to this list, and the blending device 100 electronic interlock system 151 may be contemplated to be operational with less than this full list. Moreover, the various logic circuit elements may collectively be referred to as one or more than one logic circuit element because the interlock system 151 may be contemplated to be operational with less than this full list. The wiring 158 is contemplated to be appropriately gauged wire for the application of the wire, and those skilled in the art will appreciate which gauge wire should be utilized to support the necessary electric current to operate or signal throughout the blending device 100. Moreover, the wiring 158 may connect all of the components such that the electronic interlock system 151 may operate appropriately. Any identified logic circuit element or printed computer board throughout this disclosure may be programmed to perform all of the mentioned functions within a single circuit element or may be programmed to perform only a portion of the mentioned tasks throughout this discloser, wherein those tasks may relate to a wide variety of functions as related to blending, food processing, or operating a small hand kitchen appliance.

Figure 10:
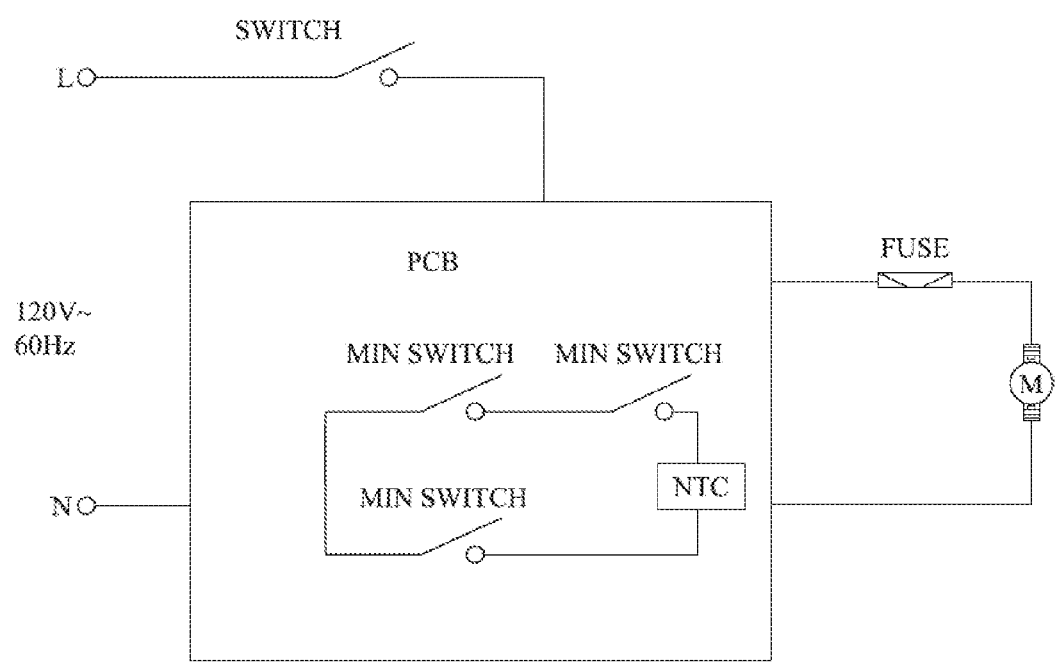
FIG. 10 is an example circuit configured to perform the operations of an example embodiment.

FIG. 10 illustrates an example circuit that may be used in various embodiments of the blending device 100. In various embodiments, the PCB may include one or more switches configured to shut off power to the blade assembly 106. In various embodiments, the switches on the PCB may be opened (e.g., power shut off) based on the thermal detector reaching a maximum temperature, the vessel pressure sensor (e.g., compression contacts 150) not meeting a minimum amount of pressure, and/or the like (such switches may be operated based at least in part on measured resistance values associated with each of these sensors in certain embodiments, as discussed above). In various embodiments, blending device 100 may have multiple switches configured to shut off the power to the blending device 100 (e.g., put the blending device 100 into the protective state). In various embodiments, the PCB may be configured to receive signals from components of the blending device 100.

Figure 11:
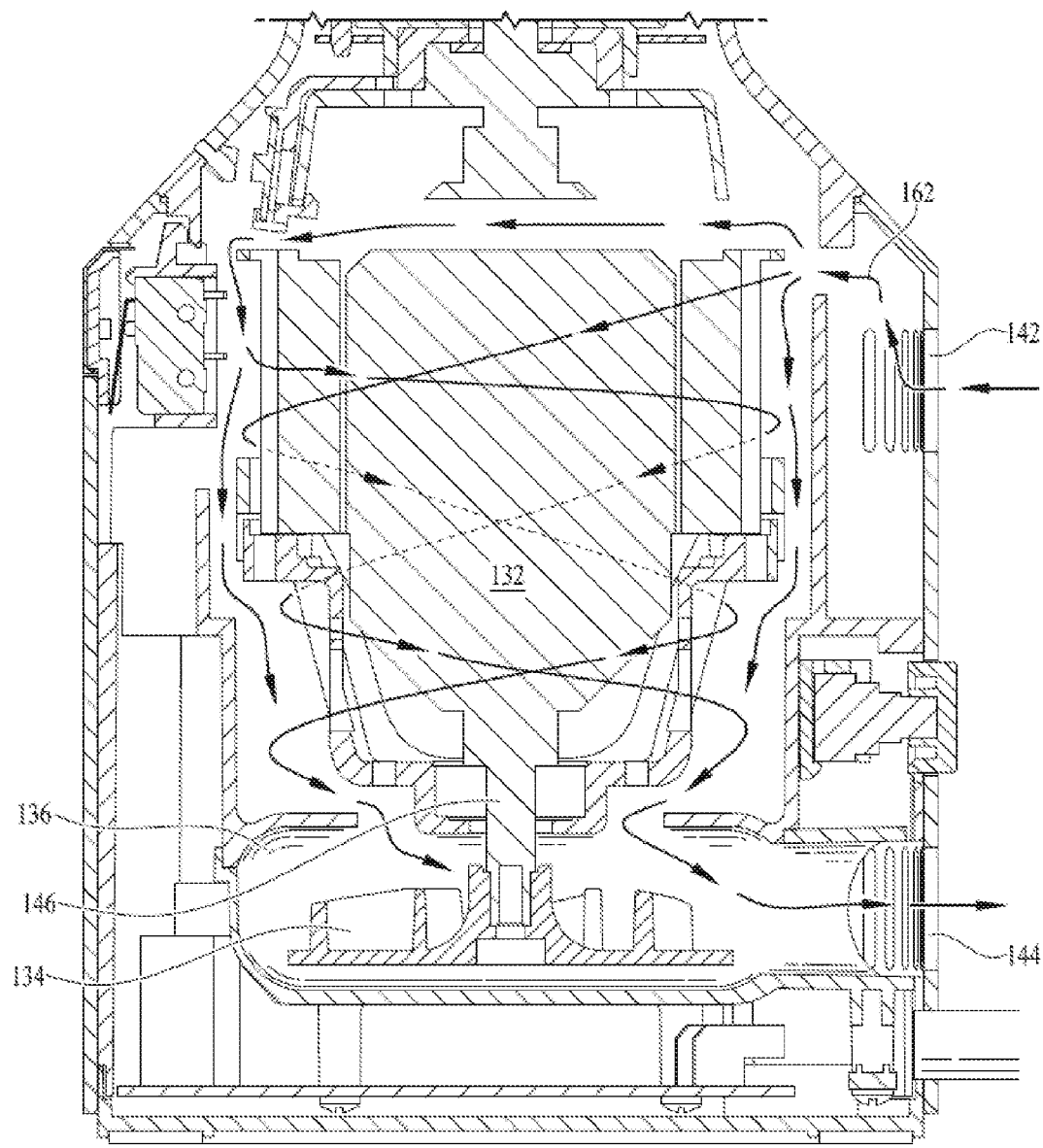
FIG. 11 is an enlarged diagrammatic cross-sectional plan view illustrating one non-limiting embodiment of airflow through a blender base.

FIG. 11 shows one potential embodiment for air flow through the blender base assembly 104. An air flow 162 is illustrated as a path through the blender base assembly 104. Accordingly, the air flow 162 initiates with the motor 132. As motor 132 begins to spin the drive shaft 146 the fan 134 also begins to move air. As previously described, the air may be expelled out of the exhaust port 144 thereby creating a vacuum towards the upper portion of the blender base assembly 104. The produced vacuum may then result in such decreased air pressure that air may then be pushed into the intake port 142 by the ambient air pressure external to the blender base assembly 104.

Air flow 162 shows the path may travel over the top of the motor 132 and under blade assembly 106, down a lateral side of motor 132, and to fan housing 136 wherein the air is pushed external to the blender base assembly 104. Air flow 162 may travel in both clockwise and counterclockwise directional flows and up through both right and left internal spaces to motor 132. Moreover, it is contemplated that additional intake port 142 and exhaust port 144 locations may be placed onto the external portion of the blender base assembly 104 to aid with air flow 162 and general cooling of motor 132. With continuous operation of the food blending device 100 via the motor 132 the air flow 162 is thus circulated through the blender base assembly 104 to maintain appropriate operating temperatures for the blender base assembly 104 and the motor 132. The air flow 162 may be such that quieter operation is achieved and therefore operation is gentler, produces less noise, and may generally be more satisfactory for the end user to operate.

Figures 12, 13:
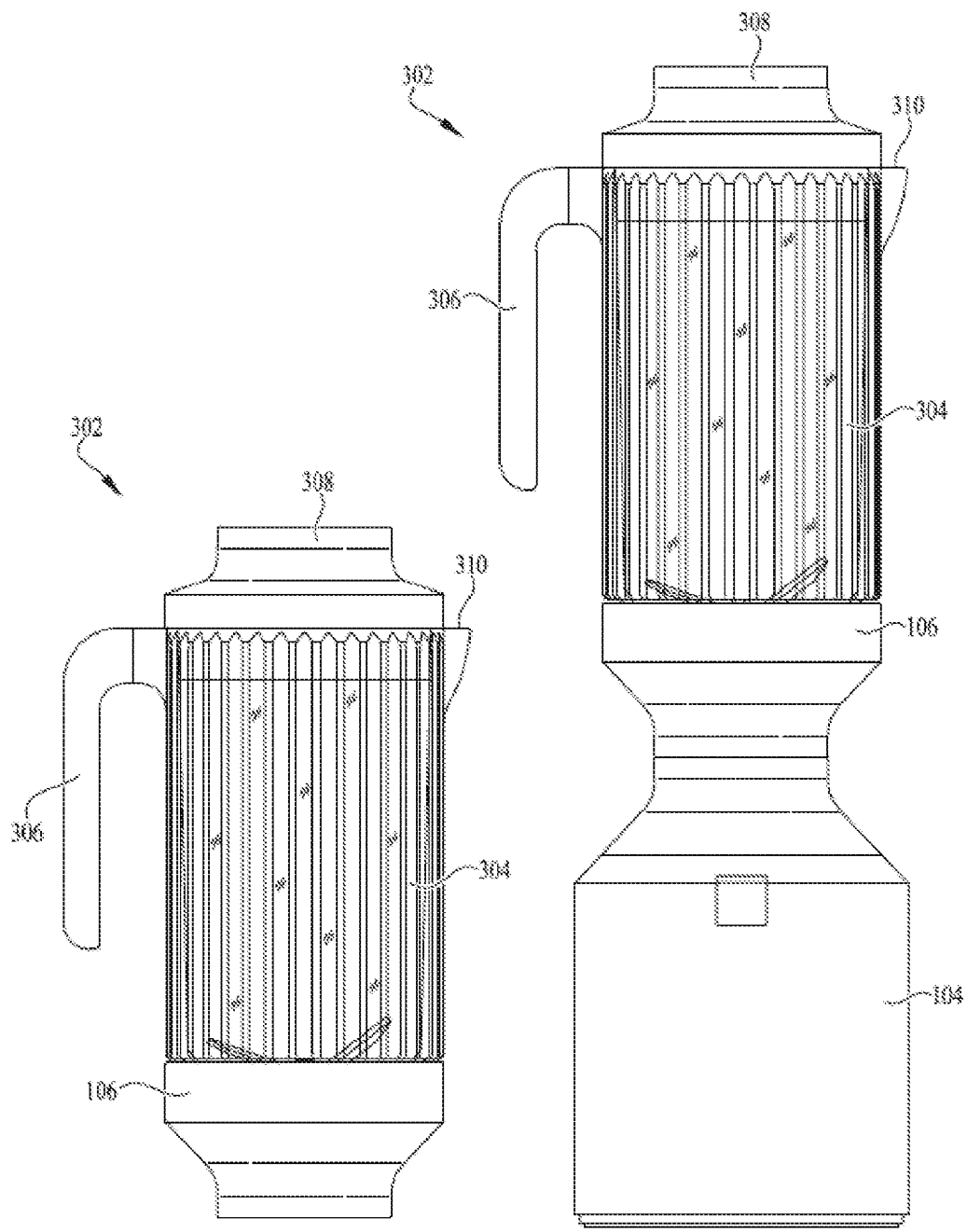
FIG. 12 is a side view of one non-limiting embodiment of a blender vessel representing a pitcher type configuration in a mated configuration with a blade assembly.
FIG. 13 is a side view of one non-limiting embodiment of a blender vessel representing a pitcher type configuration as mated with a blade assembly and a blender base.

FIGS. 12 and 13 illustrate additional potential embodiment to blending device 100, specifically further embodiments for vessel attachments to the blender base assembly 104. Shown is pitcher vessel 302. Relevant portions shown in FIG. 12 include pitcher body 304, pitcher handle 306, pitcher lid 308, and pour spout 310. Further, and of particular importance, FIG. 13 illustrates that multiple potential embodiments exist which may be configured to operate with blender base assembly 104 and blade assembly 106 as shown. The preceding discussion regarding the electronic interlock system 151 and its operation with the blender vessel 102 (shown in FIG. 1) are applicable with the pitcher vessel 302. One potential alteration when contemplating the use of pitcher vessel 302 would be the ease of pouring blended material from pour spout 310 rather than having to remove blade assembly 106 from bottom. One particular advantage of the present disclosure should be evident, the blender base assembly 104, blade assembly 106, and other contemplated components of the blending device 100 are readily modified to suit a wide variety of needs desired by the end consumer. Such versatility presents an improvement over the prior art.

Figure 14A:
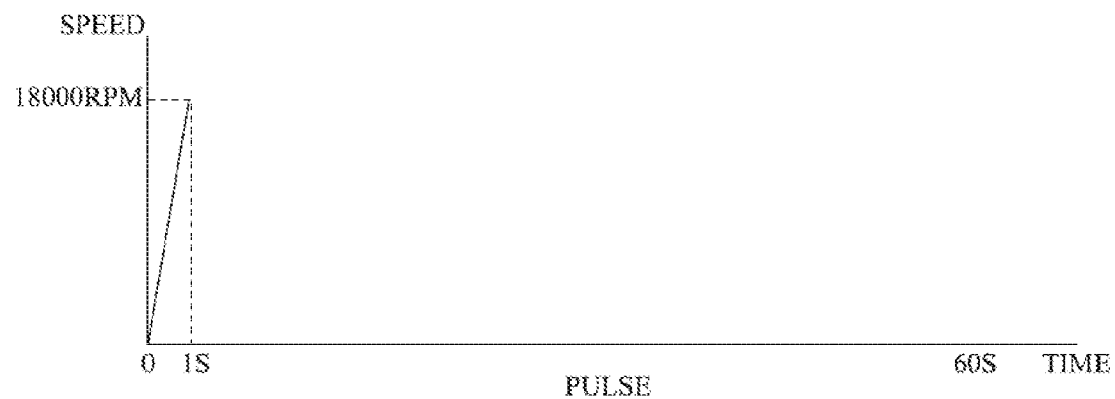
FIG. 14A illustrates an example operating mode of the blending device in accordance with an example embodiment.
Figure 14B:
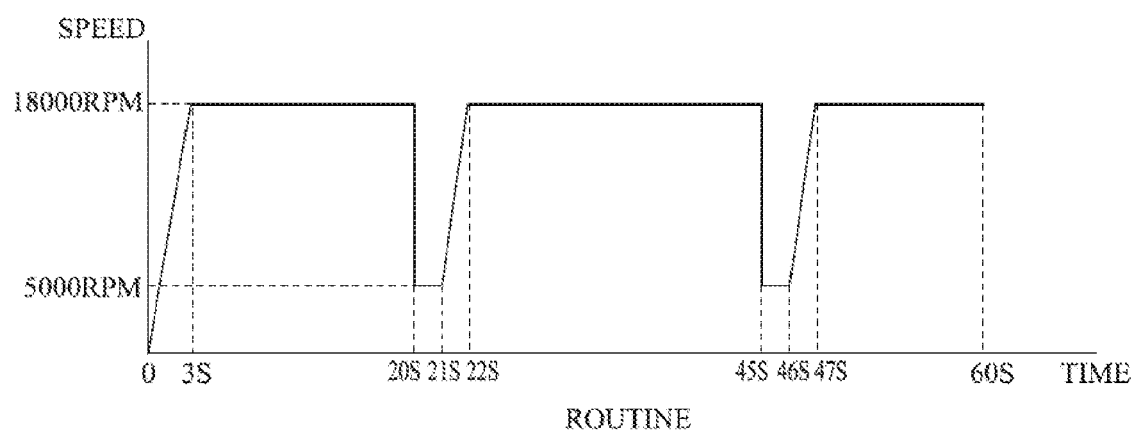
FIG. 14B illustrates another example operating mode of the blending device in accordance with an example embodiment.

FIGS. 14A and 14B illustrate two example operating modes of the blending device 100 in an instance the protection state is deactivated, the operating modes of FIGS. 14A-14B demonstrate the motor rotational speed. FIG. 14A illustrates the pulse mode being activated for one second (e.g., corresponding to a user holding the power switch 108 for 1 second). In various embodiments, in an instance the pulse mode is activated, the blending device 100 may accelerate towards a maximum speed. In various embodiments, the pulse mode may take a short amount of time.

In various embodiments, the operating mode may include powering the blending device 100 for a predetermined amount of time. For example, in FIG. 14B, the routine mode may take approximately 60 seconds. In some embodiments, the speed may be variable during the operating mode. For example, in the routine mode of FIG. 14B, the blending device 100 alternates between approximately 18000 RPM and 5000 RPM during the operating mode. In various embodiments, various different routines may be contemplated based on the substance being blended, the strength of the blender motor, the type of blade, and/or the like.

In various embodiments, the selection of the operating mode may be based on an interaction with the power switch 108. For example, the pulse mode may be activated in an instance the power switch 108 is pressed lightly (e.g., pressed, but not clicked into a locking position), while the routine (FIG. 14B) may be activated in an instance in which the power switch 108 is clicked into a locking position. Various embodiments may provide multiple power switches configured to activate different operating states (e.g., there may be a first power switch 108 for the pulse mode and a second power switch for the routine mode). In various embodiments, different operating modes may be used based on the application of the blending devices (e.g., some blending devices may have different speed patterns based on the type of substance being blended).

Having disclosed the structure of various embodiments, it is now possible to describe its function, operation, and use of a blending device 100.

Blending device 100 is contemplated for use with a wide variety of foods and other ingestible materials. A user of blending device 100 may remove blender vessel 102 from blade assembly 106 and place blender vessel 102 upside down such that the view port 112 is downward from the perspective of a user. The user then may fill the blender vessel 102 with desired contents for blending, for example, ice, fruit, grain, liquids, and a variety of other options. The user may then place blade assembly 106 over the blender vessel 102 and rotate the blade assembly 106 to engage a thread between the blender vessel 102 and the blade assembly 106. Once the blender vessel 102 and the blade assembly 106 are no longer rotatable and are thus secured to each other, the user then may rotate the combined blade assembly 106 and blender vessel 102 over such that the view port 112 is nearest to the user from the perspective of the user. The user may place the combined blade assembly 106 and blender vessel 102 over the blender base assembly 104.

As discussed, the orientation of the blade assembly 106 over the blender base assembly 104 may be immaterial, as long as the blade assembly 106 is in one of the coupling positions. In various embodiments, in order to align the blade assembly 106 and the blender base assembly 104, the locking protrusions 122 may glide past the bayonet connectors 120. A final twist in a locking direction of the blade assembly 106 in relation to the blender base assembly 104 may be performed to lock the blade assembly 106 relative to the blender base assembly 104. Said locking direction may be to the left or the right. Said final twist may align the blade electrical connectors 128 and one of the plurality of base electrical connector coupler sets 130A-130C, such that a complete circuit is formed and may lock the locking protrusions 122 under the bayonet connectors 120 for stable operational use. The user may then press the power cut switch 160 to provide the initial power to the blending device 100. The status indicator 110 may indicate, via a predetermined color, that the blending device 100 is ready for blending.

The user may then select to fully press the power switch 108 to activate the blending device 100 for a predetermined measure of time. The power switch 108 is contemplated to operate in a continuous fashion by two different methods. First, a user may depress power switch with a measured time hold, by way of example, depression of power switch 108 for 1 or 2 seconds. Second, a user may fully depress the power switch 108 with no amount of measured time, for example, a simple press of the power switch 108.

The user may also have the option to pulse the contents of the blender vessel 102 by partial depression of the power switch 108. An example pulse mode is illustrated in FIG. 14A. In some embodiments, wherein the blending device 100 is activated by depression of power switch 108 by measured time hold, that a similar full depression and quick release of the power switch 108 may activate a pulse function when depressed for less time than required to start a timed cycle. Additional operating modes may be implemented based on the substance in the blending device, the size of the motor, the type of blade, and/or the like. For example, as shown in FIG. 14B, a routine mode may vary the speed of the motor during a predetermined amount of time.

After a desired consistency of the blended material is completed by the user, the user then may twist the blade assembly 106 in relation to the blender base assembly 104 such that the locking protrusions 122 are no longer blocked by the bayonet connectors 120. Further, this may disconnect the blade electrical connectors 128 and the base electrical connector coupler sets 130A-130C, such that the circuit is broken, and the blending device 100 cannot operate accidentally. The user may then invert the combined blender vessel 102 and blade assembly 106 and disconnect the blade assembly 106 from the blender vessel 102.

The electronic interlock system 151 as illustrated in FIG. 9 may represent an important safety feature of the blending device 100. Accordingly, the threading of the blender vessel 102 onto the blade assembly 106 and subsequent depression of the compressive contact 150 indicates to the blending device 100 that the blender vessel 102 is properly fitted to the blade assembly 106. Further, the contact made between the blade electrical connectors 128 and one of the base electrical connector coupler sets 130A-130C may indicate to the blending device 100 that the blender vessel 102, the blade assembly 106, and the blender base assembly 104 are all properly aligned such that operation may commence. The first logic circuit element 140, the second logic circuit element 141, indicator logic circuit element 153, and the housing logic circuit element 152, may aid in this communication by blocking attempted operation wherein one or more signals are not detected. For example, if the blade assembly 106 and the blender base assembly 104 are properly aligned, but the blender vessel 102 is not signaling by way of the compressive contact 150 to one or more printed computer boards that the blender vessel 102 is in place, then the blending device 100 may not operate. Moreover, this may be true of the entire electronic interlock system 151. Any identified one or more than one logic circuit element or printed computer board throughout this disclosure may be programmed to perform all, one, none, or a wide variety of functions as related to blending.

The electronic interlock system 151 may receive power from an external power source via power source 138, or another means, and the internal components may then complete a circuit. The signal that the blender vessel 102 and the blade assembly 106 may be properly connected may be completed by the compressive contact 150. The signal that the blade assembly 106 and the blender base assembly 104 are properly connected may be completed by the alignment of the blade electrical connectors 128 and one of the plurality of base electrical connector coupler sets 130A-130C. The detection of an appropriate operational temperature is detected by thermal detector 154 and signal for operational temperature may be conducted along the blade electrical connectors 128 and the given base electrical connector coupler set points as well. Without each of these signals sent to the housing logic circuit element 152, the first logic circuit element 140, or the second logic circuit element 141, the blending device 100 may not operate and blend may not occur and the motor 132 may not activate. Failure of any of these connections may be represented by the status indicator 110 as a variety of indicator colors. For example, red may indicate that a thermal maximum is close, while a flashing red may indicate that the thermal maximum has been reached or exceeded; however, any variety of color, flashing or otherwise, is contemplated to be used to signal to a user the overall state of the blending device 100. This represents an enhanced safety improvement over previous blenders.

This disclosure herein may relate to a blending device 100 which may comprise a blender vessel 102, a blade assembly 106, a blender base assembly 104, and a thermal detector 154. The thermal detector 154 may be configured to be in detective proximity with a matter being blended. The matter being blended may include a wide variety of foodstuffs, liquids, and/or solids, meant for human consumption.

The blade assembly 106 may include blade electrical connectors 128 and a compressive contact 150. The compressive contact 150 may be resiliently biased to a non-communicative configuration. The blender vessel 102 may be configured to compress the compressive contact 150 to a communicative configuration when the blender vessel 102 is engaged with the blade assembly 106 in a reversible fashion.

The blender base assembly 104 may further include a plurality of base electrical connector coupler sets 130A-130C and a motor 132. The blade assembly 106 may be configured to releasably mount to the blender base assembly 104 and may, thereby, bring one of the base electrical connector coupler sets 130A-130C and the blade electrical connectors 128 into electrical communication with each other.

Accordingly, the motor 132 may be obstructed from being in electricity-receiving communication with a power source 138 unless three conditions are met. First, the compressive contact 150 may be required to be in the communicative configuration. Second, the one of the base electrical connector coupler sets 130A-130C and the blade electrical connectors 128 may need to be in the electrical communication. Third, the thermal detector 154 may need to detect a temperature below a preset thermal maximum.

Additionally, the blade assembly 106 may further include a housing logic circuit element 152 which may be configured to electronically detect the reversible engagement between the blender vessel 102 and the blade assembly 106. The housing logic circuit element 152 may further be configured to be in electronic communication with the thermal detector 154 and therein electrically detect the temperature readings therein.

Additionally, the blender base assembly 104 may further include a first logic circuit element 140 which may be configured to electronically detect the adjacent electrical communication between one of the base electrical connector coupler set 130A-130C and the blade electrical connectors 128, and a second logic circuit element 141 which may be configured to be in electronic communication with the first logic circuit element 140, the housing logic circuit element 152, and the compressive contact 150.

Additionally, the blender base assembly 104 may further include a power switch 108, a power cut switch 160, and a power source 138. The power source 138 may be configured to supply an external electromotive force, the power cut switch 160 may be configured to function as a gate and permissibly permit electrical power to energize the interlock assembly.

Additionally, the blender base assembly 104 may further include an indicator logic circuit element 153, a status indicator 110, and a light pipe. The status indicator 110 may be further configured to provide a color-coded status indication of an operative status of the interlock system 151 and the status indicator 110 may be in visual communication with the indicator logic circuit element 153 via a light pipe 155.

Additionally, the blending device 100 may have the power switch 108 in a configuration suitable to engage a preset programming functionality programmed into the first logic circuit element 140, the second logic circuit element 141, the indicator logic circuit element 153, or the housing logic circuit element 152.

Additionally, the blending device 100 may have the thermal detector 154 in a configuration suitable to be in direct contact with foodstuffs when the blender vessel 102 is reversibly engaged with the blade assembly 106. The thermal detector 154 thermal maximum may be set to any point between a range of 40 to 80 degrees centigrade.

This disclosure may also describe a food processing device 100 (additionally referred to as a blending device 100), which may have an electrical interlock system 151 which may be comprised of a blender vessel 102 and a blade assembly 106. The blade assembly 106 may have a housing logic circuit element 152, a compressive contact 150, and blade electrical connectors 128. The blender vessel 102 may be configured to reversibly engage with the compressive contact 150, and the compressive contact 150 may be biased to an off configuration when not reversibly engaged to the blender vessel 102, and biased to an on configuration when reversibly engaged to the blender vessel 102.

Additionally, the said reversible engagement may cause the compressive contact 150 to transition from an off to an on configuration. The transitioning may permit an electric signal to be transmissible to the housing logic circuit element 152. The blade assembly 106 may further have a thermal detector 154. The thermal detector 154 may be located in detective proximity with a blending matter and configured to be in electrical communication with the housing logic circuit element 152.

Said food processing device 100 may further include a blender base assembly 104 which may have a motor 132, a plurality of base electrical connector coupler sets 130, and a one or more than one logic circuit element, the blender base assembly 104 may be configured to a reversibly couple with the blade assembly 106. The reversible coupling may result in the blade electrical connectors 128 being in electronic communication with one of the base electrical connector coupler sets 130A-130C.

Said food processing device 100 may further utilize a motor 132 which may be operable only when the compressive contact 150 is configured to on, the thermal detector 154 registers a temperature below a thermal maximum, and the blade electrical connectors 128 and one of the base electrical connector coupler sets 130A-130C are in the aforementioned electronic communication with each other.

The food processing device 100 may further configure the thermal detector 154 to have a thermal maximum set between a range of 40 to 80 degrees centigrade.

The food processing device 100 may further configure one or more than one logic circuit element to be programmed to cut power from a power cut switch 160 if it is not placed into an operable configuration. Additionally, the one or more than one logic circuit element may be configured to be programmable with preset operative responses to a user's input commands.

Additionally, the blender base assembly 104 may further comprise an indicator logic circuit element 153 for the operative electrical control of a status indicator 110. The status indicator 110 may be connected to the indicator logic circuit element 153 with a light pipe 155 therein and further configured to indicate the operability status of the motor 132. The status indicator 110 may further provide color-coded visual feedback for indicating a selected programmable operative response requested by the user.

This disclosure herein may further relate to a blending device 100 interlock system 151 assembly, the interlock system 151 may comprise a blender base assembly 104 which may have a plurality of base electrical connector coupler sets 130A-130C, a first logic circuit element 140, a second logic circuit element 141, and a motor 132. A blade assembly 106 may have a thermal detector 154, blade electrical connectors 128, a housing logic circuit element 152, and a compressive contact 150. The compressive contact 150 may be resiliently biased to a non-conductive configuration.

Additionally, the blending device 100 may include a blender vessel 102 which may have a circumferential wall which may extend from a viewport 112 to a threaded end 107. The open end may be configured to reversibly threadably engage with the blade assembly 106. The reversibly threadably engagement may compressively transition the compressive contact 150 from the non-conductive configuration to a conductive configuration and may result in a conductive signal being transmissible to the housing logic circuit element 152.

Additionally, the blending device 100 may further be configured such that the blender base assembly may rotatably engage with the blade assembly 106. Such a rotatable engagement may cause the blade electrical connectors 128 and one of the base electrical connector coupler sets 130A-130C to be in electrical contact. The electrical contact may result in an energetic signal being transmissible to the first logic circuit element 140 and the second logic circuit element 141.

Additionally, the blending device 100 may include the motor 132 configured in such a manner that it may become operable when the following combination is satisfied: the reversibly threadably engagement of the blender vessel 102 with the blade assembly 106 occurs, the rotatable engagement of the blade assembly 106 onto the blender base assembly 104 occurs; and the thermal detector 154 operatively confirms contents of the blender vessel 102 are below a preset temperature threshold.

Additionally, the second logic circuit element 141 may be programmed to prohibit electromotive power sourced from a power supply 138 if the combination is not satisfied. The second logic circuit element 141 may further be programmable with operative responses to a user's input commands through a power switch 108.

Additionally, the blender base assembly 104 may further comprise an indicator logic circuit element 153 for the operative control of a status indicator 110. The status indicator 110 may be connected to the indicator logic circuit element 153 with a light pipe 155 and may further be configured to indicate the operability status of the motor 132. The status indicator 110 may further provide color-coded visual feedback and further indicating a selected programmable operative response requested by the user.

Additionally, the thermal detector 154 is in direct contact with foodstuffs when the blender vessel 102 is reversibly threadably engaged with the blade assembly 106.

While embodiments of the disclosure have been illustrated and described, it is not intended that these embodiments illustrate and describe all possible embodiments of the disclosure. Rather, the words used in the specification are words of description rather than limitation, and it is understood that various changes may be made without departing from the spirit and scope of the disclosure.

Accordingly, it is not intended that the disclosure be limited except by the appended claims. Insofar as the description above and the accompanying drawings disclose any additional subject matter that is not within the scope of the claims below, the embodiments are not dedicated to the public and the right to file one or more applications to claim such additional embodiments is reserved.

That which is claimed:

1. A blending device comprising:
   a blade assembly having a blade coupling structure, the blade coupling structure comprising a set of blade electrical connectors, wherein the blade electrical connectors of the set of blade electrical connectors are spaced apart from one another and wherein the set of blade electrical connectors comprises n blade electrical connectors;
   a blender base assembly having a base coupling structure, the base coupling structure comprising a plurality of base electrical connector coupler sets, wherein each base electrical connector coupler set comprises n base electrical connector couplers,
   wherein each base electrical connector coupler set corresponds with a coupling position of the blade coupling structure and the base coupling structure, and wherein each base electrical connector coupler set is configured to couple with the set of blade electrical connectors in a corresponding coupling position,
   wherein the plurality of base electrical connector coupler sets are arranged in an alternating arrangement around the base coupling structure such that the n base electrical connector couplers of a first base electrical connector coupler set are separated by at least one base electrical connector coupler of a second base electrical connector coupler set,
   wherein the blade assembly and the blender base assembly are electrically coupled in a closed configuration in which the set of blade electrical connectors is in contact with one of the plurality of base electrical connector coupler sets.

2. The blending device of claim 1, wherein the blending device remains in a protection state while in an open configuration in which the blender base assembly is powered and the blade assembly and the blender base assembly are separated.

3. The blending device of claim 1, further comprising a blender vessel configured to removably couple with the blade assembly, wherein the blade assembly comprises a vessel interlock configured to couple the blender vessel to the blade assembly.

4. The blending device of claim 3, wherein the blade assembly comprises one or more vessel pressure sensors configured to be engaged in an instance in which the blender vessel and the blade assembly are coupled, wherein the blending device is electrically connected in an instance the one or more vessel pressure sensors are engaged.

5. The blending device of claim 2, wherein the blade assembly further comprises a temperature sensor, wherein the blending device is configured to operate in the protection state in an instance the temperature is above a predetermined value.

6. The blending device of claim 4, wherein the blade assembly further comprises a temperature sensor, wherein the blending device is configured to operate in a protection state in an instance the temperature is above a predetermined value or the one or more of the vessel pressure sensors is not engaged.

7. The blending device of claim 1, wherein the blender base assembly comprises a power switch, wherein the power switch is configured to activate the blending device in an instance in which the blade assembly and the blender base assembly are in the closed configuration.

8. The blending device of claim 1, wherein the set of blade electrical connectors comprises n blade electrical connectors spaced at least approximately evenly around the blade coupling structure.

9. The blending device of claim 8, wherein the set of blade electrical connectors comprises two blade electrical connectors spaced approximately 180 degrees from one another around the blade coupling structure.

10. The blending device of claim 9, wherein each of the plurality of base electrical connector coupler sets has two base electrical connector couplers and the base electrical connector couplers are spaced approximately 180 degrees from one another around the base coupling structure.

11. The blending device of claim 1, wherein the blade assembly is characterized by a defined resistance signature measurable between the n blade electrical connectors, and wherein the blender base assembly comprises a controller configured to measure a resistance between the n blade electrical connectors while in the closed configuration, and wherein the blending device remains in a protection state upon determining the measured resistance does not satisfy the resistance signature.

12. The blending device of claim 11, wherein the resistance signature is between approximately 1.7 k$\Omega$ and approximately 551 K$\Omega$.

13. The blending device of claim 2, wherein the plurality of base electrical connector coupler sets comprise a first base electrical connector coupler set, and a second base electrical connector coupler set disposed circumferentially the base coupling structure, wherein the blade assembly and the blender base assembly comprise:
    a first coupling position defined as the position in which the set of blade electrical connectors are in contact with the first base electrical connector coupler set; and
    a second coupling position defined as the position in which the set of blade electrical connectors are in contact with the second base electrical connector coupler set,
    wherein the blade assembly and the blender base assembly are electrically coupled in a closed configuration in the first coupling position or the second coupling position.

14. The blending device of claim 11, wherein the plurality of base electrical connector coupler sets further comprise a third base electrical connector coupler set disposed circumferentially around the base coupling structure, wherein the blade assembly and the blender base assembly further comprise:
    a third coupling position defined as the position in which the set of blade electrical connectors are in contact with the third base electrical connector coupler set,
    wherein the blade assembly and the blender base assembly are electrically coupled in a closed configuration in the third coupling position.

15. A method of manufacturing a blending device, the method comprising:
    providing a blade assembly having a blade coupling structure, the blade coupling structure comprising a set of blade electrical connectors, wherein the blade electrical connectors of the set of blade electrical connectors are spaced apart from one another and wherein the set of blade electrical connectors comprises n blade electrical connectors; and
    providing a blender base assembly having a base coupling structure, the base coupling structure comprising a plurality of base electrical connector coupler sets, wherein each base electrical connector coupler set comprises n base electrical connector couplers, wherein each base electrical connector coupler set corresponds with a coupling position of the blade coupling structure and the base coupling structure, and wherein each base electrical connector coupler set is configured to couple with the set of blade electrical connectors in a corresponding coupling position, wherein the plurality of base electrical connector coupler sets are arranged in an alternating arrangement around the base coupling structure such that the n base electrical connector couplers of a first base electrical connector coupler set are separated by at least one base electrical connector coupler of a second base electrical connector coupler set, wherein the blade assembly and the blender base assembly are electrically coupled in a closed configuration in which the set of blade electrical connectors is in contact with one of the plurality of base electrical connector coupler sets.

16. The method of claim 15, wherein the blending device remains in a protection state while in an open configuration in which the blender base assembly is powered and the blade assembly and the blender base assembly are separated.

17. The method of claim 15, further comprising providing a blender vessel configured to removably couple with the blade assembly, wherein the blade assembly comprises a vessel interlock configured to couple the blender vessel to the blade assembly.

18. The method of claim 17, wherein providing the blade assembly comprises providing one or more vessel pressure sensors configured to be engaged in an instance in which the blender vessel and the blade assembly are coupled, wherein the blending device is electrically connected in an instance the one or more vessel pressure sensors are engaged.

19. The method of claim 16, wherein the blade assembly further comprises a temperature sensor, wherein the blending device is configured to operate in the protection state in an instance the temperature is above a predetermined value.

20. The method of claim 19, wherein the blade assembly further comprises a temperature sensor, wherein the blending device is configured to operate in a protection state in an instance the temperature is above a predetermined value or the one or more of the vessel pressure sensors is not engaged.

21. The method of claim 15, wherein the blender base assembly comprises a power switch, wherein the power switch is configured to activate the blending device in an instance in which the blade assembly and the blender base assembly are in the closed configuration.

22. The method of claim 15, wherein the set of blade electrical connectors comprises n blade electrical connectors spaced at least approximately evenly around the blade coupling structure.

23. The method of claim 22, wherein the set of blade electrical connectors comprises two blade electrical connectors spaced approximately 180 degrees from one another around the blade coupling structure.

24. The method of claim 23, wherein each of the plurality of base electrical connector coupler sets has two base electrical connector couplers and the base electrical connector couplers are spaced approximately 180 degrees from one another around the base coupling structure.

25. The method of claim 15, wherein the blade assembly is characterized by a defined resistance signature measurable between the n blade electrical connectors, and wherein the blender base assembly comprises a controller configured to measure a resistance between the n blade electrical connectors while in the closed configuration, and wherein the blending device remains in a protection state upon determining the measured resistance does not satisfy the resistance signature.

26. The method of claim 25, wherein the resistance signature is between approximately 1.7 kΩ and approximately 55 KΩ.

27. The method of claim 16, wherein the plurality of base electrical connector coupler sets comprise a first base electrical connector coupler set, and a second base electrical connector coupler set disposed circumferentially the base coupling structure, wherein the blade assembly and the blender base assembly comprise:

a first coupling position defined as the position in which the set of blade electrical connectors are in contact with the first base electrical connector coupler set; and a second coupling position defined as the position in which the set of blade electrical connectors are in contact with the second base electrical connector coupler set, wherein the blade assembly and the blender base assembly are electrically coupled in a closed configuration in the first coupling position or the second coupling position.

28. The method of claim 25, wherein the plurality of base electrical connector coupler sets further comprise a third base electrical connector coupler set disposed circumferentially around the base coupling structure, wherein the blade assembly and the blender base assembly further comprise:

a third coupling position defined as the position in which the set of blade electrical connectors are in contact with the third base electrical connector coupler set, wherein the blade assembly and the blender base assembly are electrically coupled in a closed configuration in the third coupling position.

\* \* \* \* \*